United States Patent
Katsuta et al.

(10) Patent No.: US 9,829,737 B2
(45) Date of Patent: Nov. 28, 2017

(54) LIQUID CRYSTAL DISPLAY DEVICE HAVING LOW VIEWING ANGLE DEPENDENCY

(71) Applicant: Sharp Kabushiki Kaisha, Osaka-shi, Osaka (JP)

(72) Inventors: Shohei Katsuta, Osaka (JP); Tsuyoshi Maeda, Osaka (JP); Hideomi Yui, Osaka (JP); Yuhsuke Tsuda, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 14/652,917

(22) PCT Filed: Dec. 12, 2013

(86) PCT No.: PCT/JP2013/083323
§ 371 (c)(1),
(2) Date: Jun. 17, 2015

(87) PCT Pub. No.: WO2014/097960
PCT Pub. Date: Jun. 26, 2014

(65) Prior Publication Data
US 2015/0331276 A1 Nov. 19, 2015

(30) Foreign Application Priority Data

Dec. 18, 2012 (JP) ................. 2012-275767

(51) Int. Cl.
*G02F 1/1335* (2006.01)
*G02F 1/1337* (2006.01)
*F21V 8/00* (2006.01)

(52) U.S. Cl.
CPC ...... *G02F 1/133504* (2013.01); *G02B 6/0011* (2013.01); *G02F 1/1337* (2013.01);
(Continued)

(58) Field of Classification Search
CPC ... G02F 1/133606; G02F 2001/133607; G02F 1/133604; G02F 1/133611; G02F 1/1339;
(Continued)

(56) References Cited

U.S. PATENT DOCUMENTS

2006/0007302 A1\* 1/2006 Numata ............ G02F 1/133524
348/71
2011/0279745 A1\* 11/2011 Yamamoto ........ G02F 1/133753
349/33
2014/0160410 A1 6/2014 Yamamoto et al.

FOREIGN PATENT DOCUMENTS

JP 2005-181691 A 7/2005
JP 2006-113208 A 4/2006
(Continued)

OTHER PUBLICATIONS

Katsuta, S. et al., "Optical Design of Novel Microstructure Film for Wide Viewing TN-LCD", FMC8-5L, Dec. 6, 2013, pp. 562-563.
(Continued)

*Primary Examiner* — Richard Kim
(74) *Attorney, Agent, or Firm* — Keating & Bennett, LLP

(57) ABSTRACT

Provided is a liquid crystal device including: a liquid crystal panel including a first substrate having a first vertical alignment film, a second substrate having a second vertical alignment film, a liquid crystal layer which is interposed between the first vertical alignment film and the second vertical alignment film and has a negative dielectric anisotropy, a first polarizing plate that is disposed on a light-incident side of the liquid crystal layer, and a second polarizing plate that is disposed on a light-emitting side of the liquid crystal layer; an illuminating device which is disposed on a light-incident side of the liquid crystal panel, and emits light toward the liquid crystal panel; and a light control member which is disposed on a light-emitting side of the liquid crystal panel, and diffuses light that is emitted
(Continued)

from the liquid crystal panel in an azimuth angle direction and a polar angle direction viewed from a normal direction of the liquid crystal panel to control an emission direction of the light. The liquid crystal panel includes a plurality of pixels, each being a basic unit of display, and each of the pixels has a plurality of regions in which a director direction or an alignment of liquid crystal molecules at a central portion of the liquid crystal layer in a thickness direction during application of a voltage is different.

9 Claims, 24 Drawing Sheets

(52) U.S. Cl.
CPC .. *G02F 1/133512* (2013.01); *G02F 1/133528* (2013.01); *G02B 6/0051* (2013.01); *G02B 6/0053* (2013.01); *G02F 2001/133742* (2013.01)

(58) Field of Classification Search
CPC ... G02F 1/133707; G02F 2001/133742; G02F 1/133753; G02F 1/134336; G02B 5/0278

USPC .......................................... 349/64, 130, 129
See application file for complete search history.

(56) References Cited

FOREIGN PATENT DOCUMENTS

| | | |
|---|---|---|
| JP | 2012-194312 A | 10/2012 |
| WO | 2010/087047 A1 | 8/2010 |
| WO | 2012/053501 A1 | 4/2012 |
| WO | WO 2012/053501 A1 * | 4/2012 ............... G02B 5/02 |

OTHER PUBLICATIONS

Asaoka, Y. et al., "Roll-to-Roll Fabricated Self-Alignment Microstructure Film for Improving the Viewing-Angle Characteristics of LCD", FMCp-31L, Dec. 6, 2013, pp. 659-660.

Yamamoto, E. et al., "Novel Microstructure Film for Improving Viewing Angle Characteristics of LCD", LCT6-5L, Dec. 6, 2013, pp. 82-83.

Official Communication issued in International Patent Application No. PCT/JP2013/083323, dated Mar. 11, 2014.

* cited by examiner

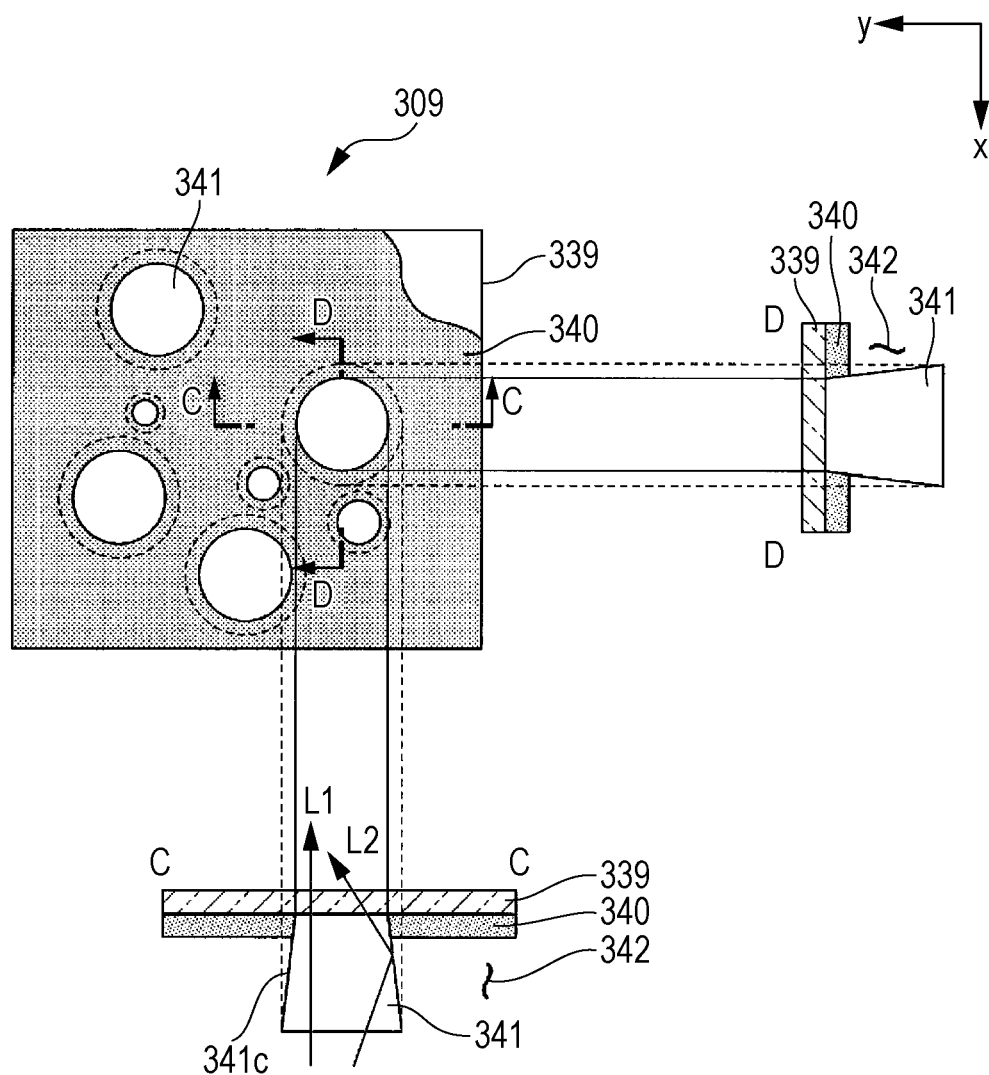

40

40G

40H

40I

40J

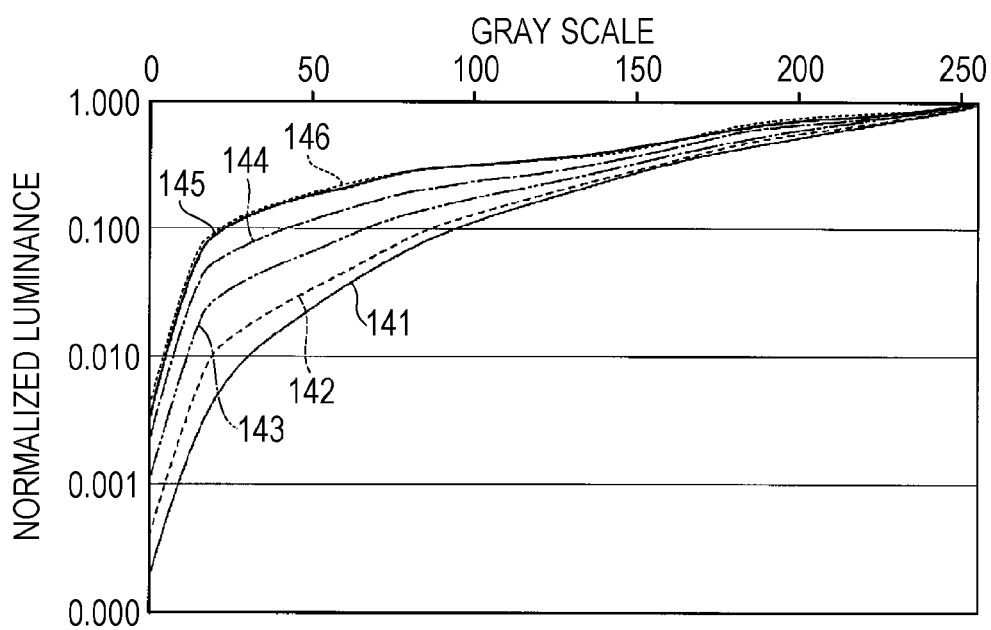
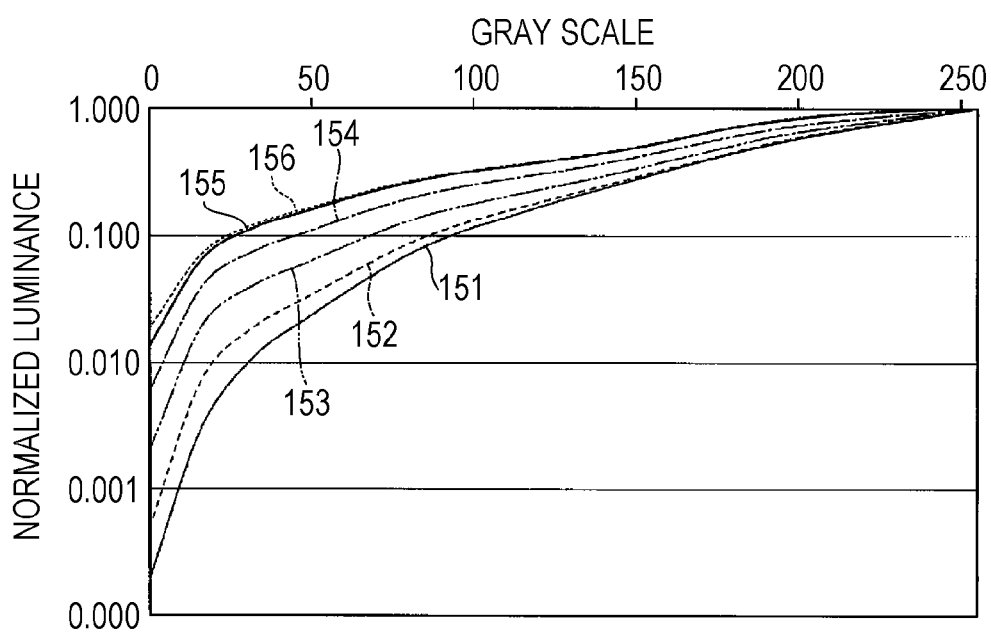

LIQUID CRYSTAL DISPLAY DEVICE HAVING LOW VIEWING ANGLE DEPENDENCY

TECHNICAL FIELD

The present invention relates to a liquid crystal display device.

Priority is claimed on Japanese Patent Application No. 2012-275767, filed Dec. 18, 2012, the content of which is incorporated herein by reference.

BACKGROUND ART

A liquid crystal display device has been widely used as a display of a portable electronic apparatus including a mobile telephone, a television, a personal computer, and the like. In general, when a display screen is viewed from a front side, the liquid crystal display device exhibits excellent display characteristics. On the other hand, when the display screen is viewed from an oblique direction, contrast decreases, and thus viewability is apt to deteriorate. Tone reversal in which brightness is reversed during gradation display, and the like may occur in some cases. According to this, various methods of widening a viewing angle range, at which a screen can be observed with satisfactory viewability, have been suggested.

For example, PTL 1 discloses a vertical alignment (VA) mode liquid crystal display device and a multi-domain vertical alignment (MVA) mode liquid crystal display device which are excellent in regard to viewing angle characteristics.

CITATION LIST

Patent Literature

PTL 1: Japanese Unexamined Patent Application Publication No. 2006-113208

SUMMARY OF INVENTION

Technical Problem

In the case of a VA mode liquid crystal display device in which four domains are included in one pixel, average directions (directors) of major axes of liquid crystal molecules included in each domain are different from each other by an azimuth angle of 90° during application of a voltage. In the VA mode liquid crystal display device having four domains, viewing angle characteristics are further improved in comparison to a VA mode liquid crystal display device in which division into a plurality of domains is not performed. Specifically, in the VA mode liquid crystal display device having four domains, in a case of obliquely viewing the liquid crystal display device in vertical and horizontal directions, a variation in gamma characteristics (gradation-luminance characteristics) is small. However, even in the VA mode liquid crystal display device having four domains, color variation occurs in a display image between a case of obliquely viewing the liquid crystal display device in vertical and horizontal directions, and a case of viewing the liquid crystal display device from the front.

The invention has been made to solve the above-described problems, and an object thereof is to provide a liquid crystal display device having low viewing-angle dependency.

Solution to Problem

A liquid crystal display device according to an aspect of the invention includes a liquid crystal panel including a first substrate having a first vertical alignment film, a second substrate having a second vertical alignment film, a liquid crystal layer which is interposed between the first vertical alignment film and the second vertical alignment film and has a negative dielectric anisotropy, a first polarizing plate that is disposed on a light-incident side of the liquid crystal layer, and a second polarizing plate that is disposed on a light-emitting side of the liquid crystal layer; an illuminating device which is disposed on a light-incident side of the liquid crystal panel, and emits light toward the liquid crystal panel; and a light control member which is disposed on a light-emitting side of the liquid crystal panel, and diffuses light that is emitted from the liquid crystal panel in an azimuth angle direction and a polar angle direction viewed from a normal direction of the liquid crystal panel to control an emission direction of the light. The liquid crystal panel includes a plurality of pixels, each being a basic unit of display, and each of the pixels has a plurality of regions in which a director direction or an alignment of liquid crystal molecules at a central portion of the liquid crystal layer in a thickness direction during application of a voltage is different.

In the liquid crystal display device according to the aspect of the invention, the light control member may include a light-transmissive base material, a light-diffusing portion that is formed on a first surface of the base material, and a light-shielding portion that is formed in a region on the first surface of the base material other than a region in which the light-diffusing portion is formed, the light-diffusing portion may have a light-emitting end surface that is located on a base material side, a light-incident end surface which is located on a side opposite to the base material side, and has an area larger than an area of the light-emitting end surface, and an inclined surface that is located between the light-emitting end surface and the light-incident end surface, a height of the light-diffusing portion from the light-incident end surface to the light-emitting end surface may be higher than a height of the light-shielding portion, and a material having a refractive index, which is lower than a refractive index of the light-diffusing portion, may exist in a gap between light-diffusing portions which is in a region in which the light-diffusing portions are not formed.

In the liquid crystal display device according to the aspect of the invention, light scattering characteristics of the light control member may have line symmetry of two axes or more when viewed from a normal direction of the liquid crystal panel.

In the liquid crystal display device according to the aspect of the invention, a planar shape of the light-shielding portion when viewed from a normal direction of the base material may be a circular shape.

In the liquid crystal display device according to the aspect of the invention, a planar shape of the light-shielding portion when viewed from a normal direction of the base material may be an anisotropic shape having the major axis and the minor axis, the light-shielding portion may include a plurality of light-shielding portions disposed such that an extending direction of the major axis and an extending direction of the minor axis are different among the plurality of light-shielding portions.

In the liquid crystal display device according to the aspect of the invention, the extending direction of the major axis and the extending direction of the minor axis of the light-shielding portions may approximately match a director direction of the liquid crystal molecules in the plurality of regions.

In the liquid crystal display device according to the aspect of the invention, the planar shape may be an elliptical shape.

In the liquid crystal display device according to the aspect of the invention, the planar shape may be a polygonal shape that is inscribed in an ellipse.

In the liquid crystal display device according to the aspect of the invention, an angle made by the light-incident end surface and the inclined surface of the light-diffusing portion may be 80°±5°.

In the liquid crystal display device according to the aspect of the invention, an area ratio of the light-shielding portion to a total area of the first surface of the base material may be 30%±10%.

In the liquid crystal display device according to the aspect of the invention, the first vertical alignment film and the second vertical alignment film may be optical alignment films.

In the liquid crystal display device according to the aspect of the invention, the liquid crystal panel may perform monaural color display.

Advantageous Effects of Invention

According to the aspect of the invention, it is possible to provide a liquid crystal display device having low viewing-angle dependency without application of a complicated circuit structure.

BRIEF DESCRIPTION OF DRAWINGS

FIG. 10 is a plan view of a light control member according to a second embodiment of the invention.

FIG. 21 is a view illustrating gamma characteristics in the case of changing the polar angle $\theta$ at an azimuth angle $\phi$ of 0° in a liquid crystal display device according to a comparative example.

FIG. 22 is a view illustrating gamma characteristics in the case of changing the polar angle $\theta$ at an azimuth angle $\phi$ of 315° in the liquid crystal display device according to the comparative example.

DESCRIPTION OF EMBODIMENTS

First Embodiment

Hereinafter, an embodiment of the invention will be described with reference to FIG. 1 to FIG. 9D.

In this embodiment, a liquid crystal display device provided with a transmissive liquid crystal panel will be described as an example.

In addition, in the following drawings, so as to easily recognize respective constituent elements, dimensional scales may be made different in some constituent elements.

Figure 1:
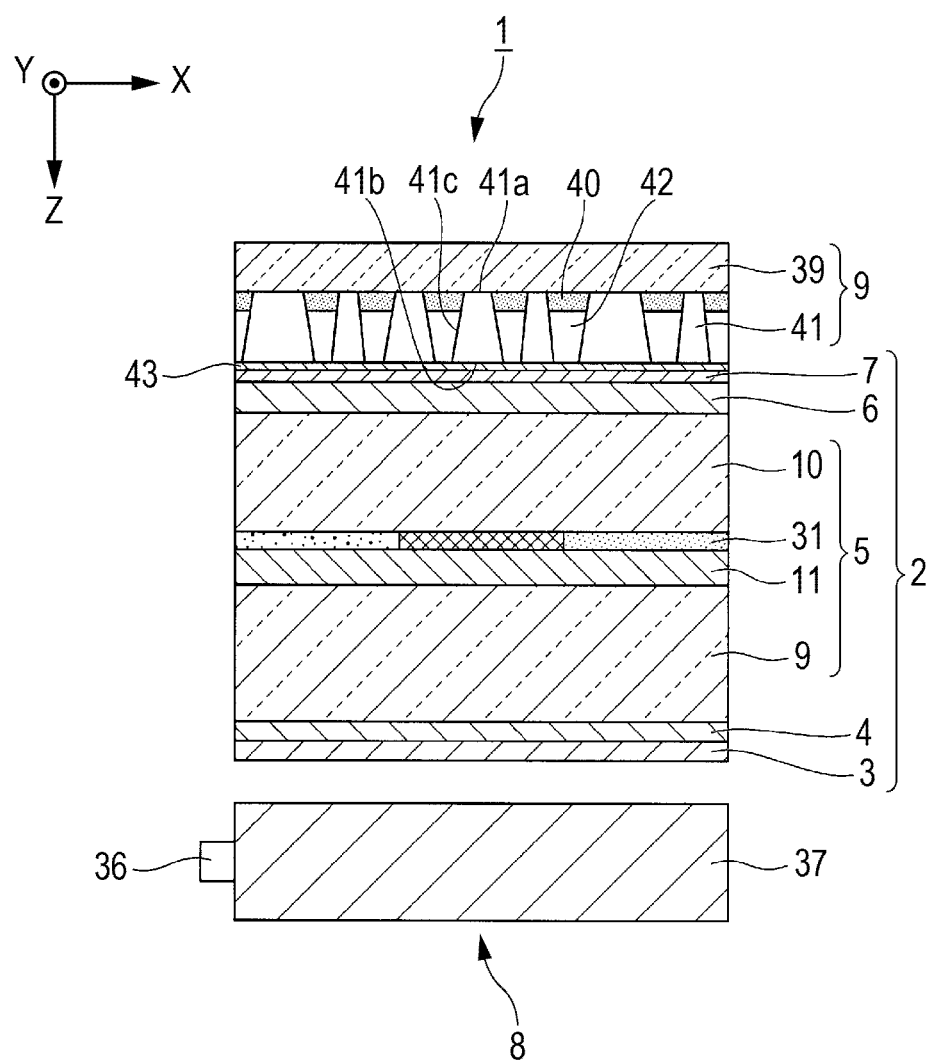
FIG. 1 is a view illustrating a light source device according to an embodiment of the invention.

FIG. 1 is a cross-sectional view of a liquid crystal display device 1 of this embodiment.

As illustrated in FIG. 1, the liquid crystal display device 1 of this embodiment includes a liquid crystal panel 2, a backlight 8 (illuminating device), and a light control member 9 (light control member). The liquid crystal panel 2 includes a first polarizing plate 3, a first retarder 4 (phase plate), a liquid crystal cell 5, a second retarder 6 (phase plate), and a second polarizing plate 7. In FIG. 1, the liquid crystal cell 5 is schematically illustrated, but a detailed structure thereof will be described later.

An observer views a display image of the liquid crystal display device 1 through the light control member 9. In the following description, a side in which the light control member 9 is disposed is referred to as a viewing side. A side in which the backlight 8 is disposed is referred to as a rear surface side. In addition, in the following description, an x-axis is defined as a horizontal direction of a screen of a liquid crystal display device. A y-axis is defined as a vertical direction of the screen of the liquid crystal display device. A z-axis is defined as a thickness direction of the liquid crystal display device.

In the liquid crystal display device 1 of this embodiment, light that is emitted from the backlight 8 is modulated in the liquid crystal panel 2, and a predetermined image, characters, and the like are displayed by the modulated light. In addition, when light that is emitted from the liquid crystal panel 2 is transmitted through the light control member 9, light is emitted from the light control member 9 in a state in which light distribution of the emitted light is further spread out in comparison to light distribution prior to incidence into the light control member 9. According to this, the observer can view display with a wide viewing angle.

Hereinafter, a specific configuration of the liquid crystal panel 2 will be described.

Here, an active matrix type transmissive liquid crystal panel will be described as an example. However, a liquid crystal panel that is applicable to this embodiment is not limited to the active matrix type transmissive liquid crystal panel. For example, the liquid crystal panel that is applicable to this embodiment may be a transflective (transmissive and reflective) liquid crystal panel. In addition, the liquid crystal panel may be a liquid crystal panel of a simple matrix type in which each pixel is not provided with a thin film transistor (hereinafter, abbreviated as a TFT) for switching.

Figure 2:
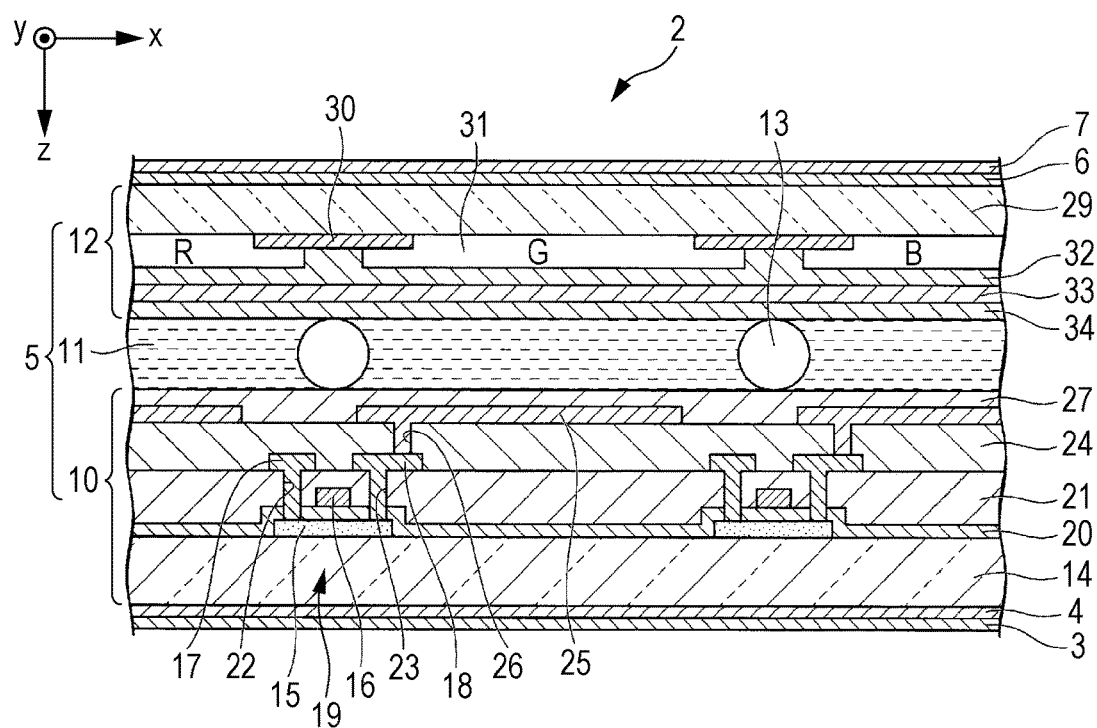
FIG. 2 is a longitudinal cross-sectional view of a liquid crystal panel according to a first embodiment of the invention.

FIG. 2 is a longitudinal cross-sectional view of the liquid crystal panel 2.

As illustrated in FIG. 2, the liquid crystal cell 5 includes a TFT substrate 10, a color filter substrate 12, and a liquid crystal layer 11. The TFT substrate 10 functions as a switching element substrate. The color filter substrate 12 is disposed to face the TFT substrate 10. The liquid crystal layer 11 is interposed between the TFT substrate 10 and the color filter substrate 12.

The liquid crystal layer 11 is enclosed in a space surrounded by the TFT substrate 10, the color filter substrate 12, and a frame-shaped sealing member (not illustrated). The sealing member bonds the TFT substrate 10 and the color filter substrate 12 with a predetermined gap therebetween.

For example, the liquid crystal panel 2 of this embodiment performs display in a vertical alignment (VA) mode.

A liquid crystal having negative dielectric anisotropy is used in the liquid crystal layer 11. A spacer 13 is disposed between the TFT substrate 10 and the color filter substrate 12. The spacer 13 has a spherical shape or a columnar shape. The spacer 13 maintains a constant gap between the TFT substrate 10 and the color filter substrate 12.

Although not illustrated, a plurality of pixels are arranged in the TFT substrate 10 in a matrix shape.

Each of the pixels is a basic unit of display. In the TFT substrate 10, a plurality of source bus lines are formed to extend in parallel with each other. In the TFT substrate 10, a plurality of gate bus lines are formed to extend in parallel with each other. The plurality of gate bus lines are perpendicular to the plurality of source bus lines. The plurality of source bus lines and the plurality of gate bus lines are formed on the TFT substrate 10 in a lattice shape. A rectangular region, which is partitioned by the source bus lines adjacent to each other, and the gate bus lines adjacent to each other, becomes one pixel. Each of the source bus lines is connected to a source electrode 17 of the TFT 19. Each of the gate bus lines is connected to a gate electrode 16 of the TFT 19.

The TFT 19, which includes a semiconductor layer 15, the gate electrode 16, the source electrode 17, a drain electrode 18, and the like, is formed on a surface on a liquid crystal layer 11 side of a transparent substrate 14 that constitutes the TFT substrate 10. As the transparent substrate 14, for example, a glass substrate may be used.

The semiconductor layer 15 is formed on the transparent substrate 14. As a material of the semiconductor layer 15, for example, a semiconductor material such as continuous grain silicon (CGS), low-temperature poly-silicon (LPS), and α-Si (amorphous silicon) is used.

A gate insulating film 20 is formed on the transparent substrate 14 so as to cover the semiconductor layer 15.

As a material of the gate insulating film 20, for example, a silicon oxide film, a silicon nitride film, a laminated film of these films, or the like is used.

The gate electrode 16 is formed on the gate insulating film 20 so as to face the semiconductor layer 15. As a material of the gate electrode 16, for example, a laminated film of tungsten (W)/tantalum nitride (TaN), molybdenum (Mo), titanium (Ti), aluminum (Al), or the like is used.

A first insulating interlayer 21 is formed on the gate insulating film 20 so as to cover the gate electrode 16. As a material of the first insulating interlayer 21, for example, a silicon oxide film, a silicon nitride film, a laminated film of these films, or the like is used.

The source electrode 17 and the drain electrode 18 are formed on the first insulating interlayer 21. A contact hole 22 and a contact hole 23 are formed in the first insulating interlayer 21 and the gate insulating film 20 so as to pass through the first insulating interlayer 21 and the gate insulating film 20.

The source electrode 17 is connected to a source region of the semiconductor layer 15 through the contact hole 22. The drain electrode 18 is connected to a drain region of the semiconductor layer 15 through the contact hole 23. As a material of the source electrode 17 and the drain electrode 18, the same conductive material as that of the gate electrode 16 is used.

A second insulating interlayer 24 is formed on the first insulating interlayer 21 so as to cover the source electrode 17 and the drain electrode 18. As a material of the second insulating interlayer 24, the same material as that of the first insulating interlayer 21, or an organic insulating material is used.

A pixel electrode 25 is formed on the second insulating interlayer 24. A contact hole 26 is formed in the second insulating interlayer 24 so as to pass through the second insulating interlayer 24. The pixel electrode 25 is connected to the drain electrode 18 through the contact hole 26. The pixel electrode 25 is connected to the drain region of the semiconductor layer 15 by using the drain electrode 18 as a relay electrode.

As a material of the pixel electrode 25, for example, a transparent conductive material such as indium tin oxide (ITO) or indium zinc oxide (IZO) is used.

According to the configuration, when a scanning signal is supplied through the gate bus line, and thus the TFT 19 is turned on, an image signal that is supplied to the source electrode 17 through the source bus line is supplied to the pixel electrode 25 through the semiconductor layer 15 and the drain electrode 18. In addition, the TFT 19 may be a top gate type TFT that is illustrated in FIG. 2, or a bottom gate type TFT.

A first vertical alignment film 27 is formed on the entire surface of the second insulating interlayer 24 so as to cover the pixel electrode 25. The first vertical alignment film 27 has an alignment regulation function of vertically aligning liquid crystal molecules which constitute the liquid crystal layer 11. The first vertical alignment film 27 is a so-called vertical alignment film. In this embodiment, an alignment treatment is performed with respect to the first vertical alignment film 27 by using an optical alignment technology. That is, in this embodiment, an optical alignment film is used as the first vertical alignment film 27.

On the other hand, a black matrix 30, a color filter 31, a planarizing layer 32, a counter electrode 33, and a second vertical alignment film 34 are sequentially formed on a surface on a liquid crystal layer 11 side of the transparent substrate 29 that constitutes the color filter substrate 12.

The black matrix 30 has a function of blocking transmission of light in a region between pixels. For example, the black matrix 30 is formed from a metal such as chromium (Cr) and a multi-layer film of Cr/Cr oxide, or a photoresist obtained by dispersing carbon particles in a photosensitive resin.

Dyes of respective colors of red (R), green (G), and blue (B) are included in the color filter 31. The color filter 31 of any one of R, G, and B is disposed to face one pixel electrode 25 on the TFT substrate 10. In addition, the color filter 31 may have a multi-color configuration of three or more colors including R, G, and B.

The planarizing layer 32 is constituted as an insulating film that covers the black matrix 30 and the color filter 31. The planarizing layer 32 has a function of mitigating and planarizing a step difference, which occurs due to the black matrix 30 and the color filter 31.

The counter electrode 33 is formed on the planarizing layer 32. As a material of the counter electrode 33, the same transparent conductive material as that of the pixel electrode 25 is used.

The second vertical alignment film 34 is formed on the entire surface of the counter electrode 33. The second vertical alignment film 34 has an alignment regulation function of vertically aligning the liquid crystal molecules which constitute the liquid crystal layer 11. The second vertical alignment film 34 is a so-called vertical alignment film. In this embodiment, an alignment treatment is performed with respect to the second vertical alignment film 34 by using optical alignment technology. That is, in this embodiment, an optical alignment film is used as the second vertical alignment film 34.

Returning to FIG. 1, the backlight 8 that is an illuminating device includes a light source 36 and a light guide 37. The light source 36 is disposed on an end surface of the light guide 37. As the light source 36, for example, a light-emitting diode, a cold-cathode tube, or the like is used.

The backlight 8 of this embodiment is an edge light type backlight.

The light guide 37 has a function of guiding light, which is emitted from the light source 36, to the liquid crystal panel 2. As a material of the light guide 37, for example, a resin material such as an acrylic resin is used.

Light, which is incident to the end surface of the light guide 37 from the light source 36, propagates while being totally reflected at the inside of the light guide 37, and is emitted from an upper surface (light emitting surface) of the light guide 37 with an approximately uniform intensity. Although not illustrated, a scattering sheet and a prism sheet are disposed on the upper surface of the light guide 37, and a scattering sheet is disposed on a lower surface of the light guide 37. The light, which is emitted from the upper surface of the light guide 37, is scattered by the scattering sheet and is condensed by the prism sheet, and is emitted as approximately parallel light.

As the scattering sheet, white PET may be used. As the prism sheet, for example, BEF (product name) manufactured by Sumitomo 3M Limited is used.

In this embodiment, it is not particularly desired for the backlight 8 to have directivity. As the backlight 8 of this embodiment, a backlight (hereinafter, may be referred to as a typical backlight) in which the light emitting direction is controlled and thus directivity is moderately set to a certain extent is used. However, in this embodiment, the backlight 8 may have directivity.

The first polarizing plate 3 is provided between the backlight 8 and the liquid crystal cell 5. The first polarizing plate 3 functions as a polarizer. The second polarizing plate 7 is provided between the liquid crystal cell 5 and the light control member 9. The second polarizing plate 7 functions as a polarizer. A transmission axis of the first polarizing plate 3 and a transmission axis of the second polarizing plate 7 are arranged in crossed-Nicols.

The first retarder 4, which compensates for a phase difference in light, is provided between the first polarizing plate 3 and the liquid crystal cell 5. The second retarder 6, which compensates for the phase difference in light, is provided between the second polarizing plate 7 and the liquid crystal cell 5.

As the retarders (the first retarder 4 and the second retarder 6) of this embodiment, a WV film manufactured by Fujifilm Corporation is used.

Next, the light control member 9 will be described in detail.

Figure 3:
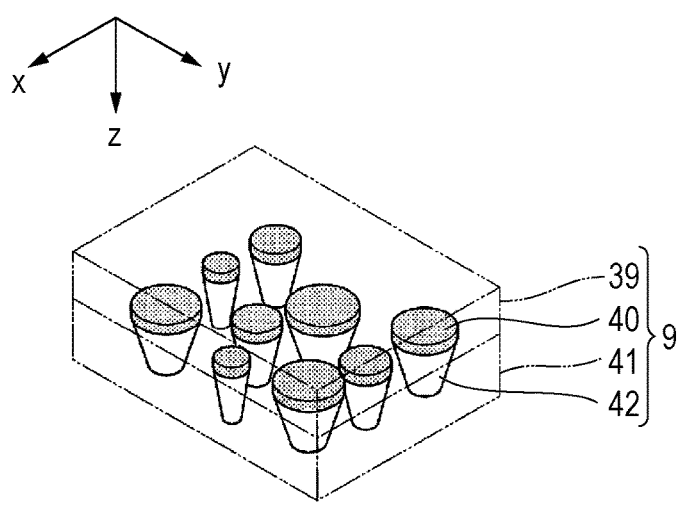
FIG. 3 is a perspective view when viewing a light control member from a viewing side.
Figure 4:
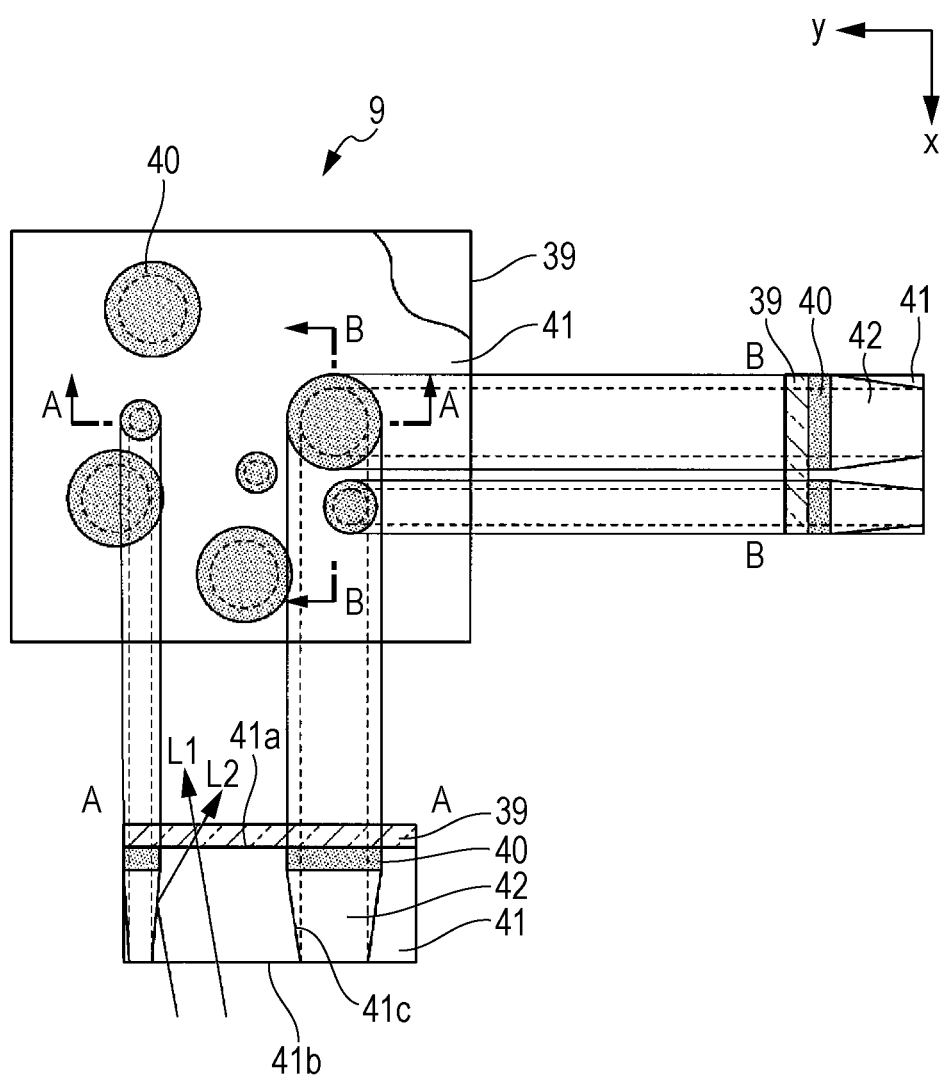
FIG. 4 is a schematic view of the light control member.

FIG. 3 is a perspective view when viewing the light control member 9 from a viewing side. FIG. 4 is a schematic view of the light control member 9. In FIG. 4, a left-upper section represents a plan view of the light control member 9. A left-lower section represents a cross-sectional view taken along line A-A in the plan view on the left-upper section. A right-upper section represents a cross-sectional view taken along line B-B in the plan view on the left-upper section.

As illustrated in FIG. 3, the light control member 9 includes a base material 39, a plurality of light-shielding layers 40, and a light-diffusing portion 41. The plurality of light-shielding layers 40 are formed on one surface (surface opposite to a viewing side) of the base material 39. The light-diffusing portion 41 is formed in a region on one surface of the base material 39 other than a region in which the light-shielding layers 40 are formed.

As illustrated in FIG. 1, the light control member 9 is disposed on the second polarizing plate 7 in a state in which the light-diffusing portion 41 faces the second polarizing plate 7 and the base material 39 faces the viewing side. The light control member 9 is fixed to the second polarizing plate 7 through an adhesive layer 43.

For example, as the base material 39, a base material, which is formed from a transparent resin such as a triacetyl cellulose (TAC) film, a polyethylene terephthalate (PET) film, a polycarbonate (PC) film, a polyethylene naphthalate (PEN) film, and a polyether sulfone (PES) film, is preferably used. The base material 39 becomes a base during the subsequent application of a material of the light-shielding layers 40 or the light-diffusing portion 41 in a manufacturing process. It is desirable for the base material 39 to have sufficient heat resistance and mechanical strength during a heat treatment process in the manufacturing process. Accordingly, other than the resin base material, a glass base material, or the like may be used as the base material 39. However, it is preferable that the thickness of the base material 39 is small to a certain extent in which the heat resistance or the mechanical strength thereof is not damaged. The reason is as follows. As the thickness of the base material 39 increases, there is a concern that blur of display may occur. In addition, it is preferable that the total light transmittance of the base material 39 is 90% or higher in accordance with JIS K7361-1. When the total light transmittance is 90% or greater, it is possible to obtain sufficient transparency.

In this embodiment, a transparent resin base material having a thickness of 100 μm is used as an example.

The light-shielding layers 40 are randomly disposed when viewed from a normal direction of a main surface of the base material 39. As an example, the light-shielding layers 40 are constituted by an organic material such as a black resist and a black ink which have light absorbing properties and photosensitivity. Other than such material, a metal film such as chromium (Cr) and a multi-layer film of Cr/Cr oxide may be used.

For example, the light-diffusing portion 41 is constituted by an organic material such as an acrylic resin and an epoxy resin which have optical transparency and photosensitivity. In addition, it is preferable that the total light transmission of the light-diffusing portion 41 is 90% or greater in accordance with JIS K7361-1. When the total light transmittance is 90% or greater, it is possible to obtain sufficient transparency.

As illustrated in FIG. 4, the light-diffusing portion 41 has a light-emitting end surface 41*a*, a light-incident end surface 41*b*, and a reflective surface 41*c*. The light-emitting end surface 41*a* is a surface that is in contact with the base material 39. The light-incident end surface 41*b* is a surface that is opposite to the light-emitting end surface 41*a*. The reflective surface 41*c* is a tapered side surface of the light-diffusing portion 41. The reflective surface 41*c* is a surface that reflects light incident from the light-incident end surface 41*b*. An area of the light-incident end surface 41*b* is larger than an area of the light-emitting end surface 41*a*.

The light-diffusing portion 41 is a portion that contributes to light transmission in the light control member 9. Among rays of light, which are incident to the light-diffusing portion 41, light L1 is not reflected from the reflective surface 41*c* and is emitted from the light-emitting end surface 41*a*. Among rays of light, which are incident to the light-diffusing portion 41, light L2 is guided in a state of being approximately closed at the inside of the light-diffusing portion 41 while being totally reflected from the reflective surface 41*c* of the light-diffusing portion 41, and is emitted from the light-emitting end surface 41*a*.

In the light control member 9, the base material 39 is disposed on the viewing side. According to this, in the two opposite surfaces of the light-diffusing portion 41, the surface having a smaller area becomes the light-emitting end surface 41*a*. On the other hand, the surface having a larger area becomes the light-incident end surface 41*b*.

An inclination angle (an angle made by the light-incident end surface 41*b* and the reflective surface 41*c*) of the reflective surface 41*c* of the light-diffusing portion 41 may be approximately 80°±5°, and is approximately 80°, for example. However, the inclination angle of the reflective surface 41*c* of the light-diffusing portion 41 is not particularly limited as long as the inclination angle is set to an angle with which incident light is capable of being sufficiently diffused during emission from the light control member 9. In this embodiment, the inclination angle of the reflective surface 41c of the light-diffusing portion 41 is set to be constant.

A height of the light-diffusing portion 41 from the light-incident end surface 41b to the light-emitting end surface 41a is set to be larger than the layer thickness of the light-shielding layers 40. In this embodiment, the layer thickness of the light-shielding layer 40 is approximately 150 nm, for example. A height of the light-diffusing portion 41 from the light-incident end surface 41b to the light-emitting end surface 41a is approximately 20 v, for example. A portion, which is surrounded by the reflective surface 41c of the light-diffusing portion 41 and each of the light-shielding layers 40 is set as a hollow portion 42. Air exists in the hollow portion 42.

In addition, it is desirable for a refractive index of the base material 39 and a refractive index of the light-diffusing portion 41 to be substantially the same as each other. The reason is as follows. For example, a case is considered where the refractive index of the base material 39 and the refractive index of the light-diffusing portion 41 are very different from each other. In this case, when light incident from the light-incident end surface 41b is emitted from the light-diffusing portion 41, unnecessary light refraction or reflection may occur on an interface between the light-diffusing portion 41 and the base material 39. In this case, the following problems and the like may occur. Specifically, a desired viewing angle is not obtained, and the amount of emitted light decreases.

In the case of this embodiment, air exists in the hollow portion 42 (outside of the light-diffusing portion 41). According to this, for example, when assuming that the light-diffusing portion 41 is formed from a transparent acrylic resin, the reflective surface 41c of the light-diffusing portion 41 becomes an interface between the transparent acrylic resin and air. Here, the hollow portion 42 may be filled with a different material having a low refractive index. However, a difference in a refractive index at the interface between the inside and the outside of the light-diffusing portion 41 becomes the maximum in a case where air exists at the outside in comparison to a case where any other material having a low refractive index exists at the outside.

Accordingly, in accordance with Snell's law, a critical angle in the configuration of this embodiment becomes the minimum, and an incidence angle range in which light is totally reflected from the reflective surface 41c of the light-diffusing portion 41 becomes widest. As a result, light loss is further suppressed, and thus high luminance can be obtained.

As illustrated in the left-upper section of FIG. 4, in the light control member 9 of this embodiment, the plurality of light-shielding layers 40 are provided on one surface of the base material 39 in a scattered manner. A planar shape of each of the light-shielding layers 40 when viewed from a normal direction of the base material 39 is a circular shape. The diameter of the light-shielding layers 40 is, for example, approximately 15 μm.

A ratio of an area of the light-shielding layers 40 to a total area of the base material 39 is, for example, 30%±10%.

As illustrated in a left-lower section and a right-upper section of FIG. 4, a portion, which corresponds to a lower side of each of the light-shielding layer 40, becomes the hollow portion 42 having a truncated conical shape. The light control member 9 includes a plurality of the hollow portions 42. The light-diffusing portion 41 is continuously provided at a portion other than the plurality of hollow portions 42.

The planar shape of the light-shielding layer 40 may include shapes such as an elliptical shape, a polygonal shape, and a semi-circular shape. It is preferable that the planar shape of the light-shielding layer 40 is a shape having line symmetry of two axes or more. The shape having line symmetry of two axes or more represents a shape that is line symmetrical to at least two or more line segments. For example, as the shape that is line symmetrical to two line segments, a rectangular shape may be exemplified. In addition, in the case of circular shape, it can be understood that the number of axes of the line symmetry is infinite, and thus it is assumed that the circular shape is included in the shape having line symmetry of two axes or more. As described above, in a case where the planar shape of the light-shielding layer 40 has a shape having line symmetry of two axes or more, light scattering characteristics of the light control member 9 have line symmetry of two axes or more when viewed from a normal direction of the liquid crystal panel 2.

In addition, parts of the light-shielding layers 40 may be formed to overlap each other.

Hereinafter, description will be given of a case where the light control member 9 and a VA mode liquid crystal are used in combination.

Figure 5:
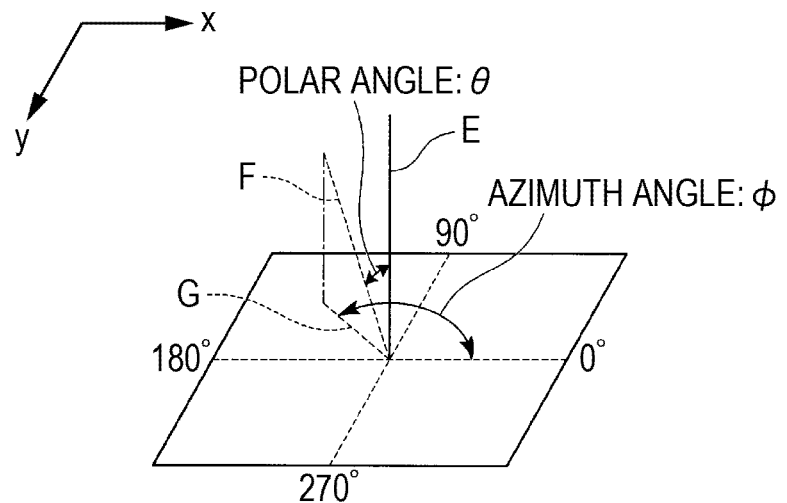
FIG. 5 is a view for describing definition of a polar angle and an azimuth angle.

FIG. 5 is a view for describing definition of a polar angle and an azimuth angle.

Here, as illustrated in FIG. 5, when a normal direction E of a screen of the liquid crystal display device 1 is set as a reference, an angle made by a visual line direction F of an observer is set as a polar angle θ. When a positive direction (0° direction) of the x-axis is set as a reference, an angle made by a direction of a line segment G obtained by projecting the visual line direction F of the observer onto a screen is set as an azimuth angle φ.

Figure 6:
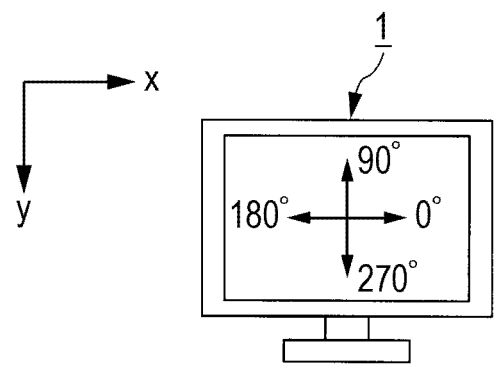
FIG. 6 is a front view of a liquid crystal display device 1.

FIG. 6 is a front view of the liquid crystal display device 1.

As illustrated in FIG. 6, in the screen of the liquid crystal display device 1, the horizontal direction (x-axis direction) is set as a direction in which the azimuth angle φ is 0° or 180°. The vertical direction (y-axis direction) is set as a direction in which the azimuth angle φ is 90° or 270°. In addition, in this embodiment, a transmission axis of the first polarizing plate 3 is a direction in which the azimuth angle φ is 90° or 270°, and a transmission axis of the second polarizing plate 7 is a direction in which the azimuth angle φ is 0° or 180°.

Figure 7:
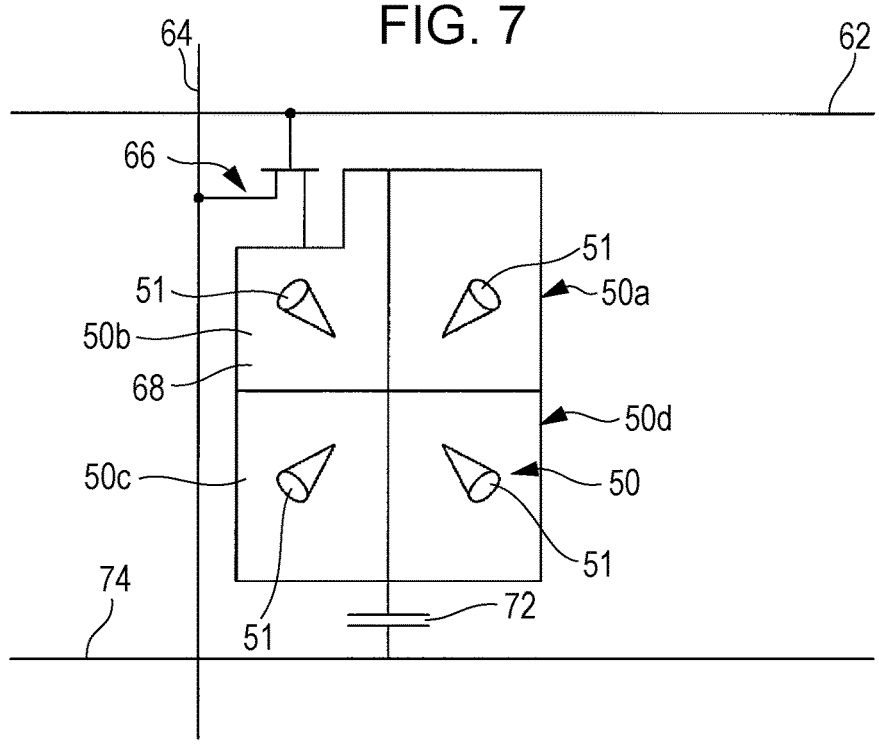
FIG. 7 is a schematic view illustrating an electrical configuration of the liquid crystal display device according to the first embodiment of the invention.

FIG. 7 schematically illustrates an electrical configuration of one pixel of the liquid crystal display device 1 of this embodiment.

A pixel 50 is connected to a TFT 66 and an auxiliary capacitor (CS) 72. A gate electrode of the TFT 66 is connected to a scanning line 62. A source electrode is connected to a signal line 64. The auxiliary capacitor 72 is connected to an auxiliary capacitor interconnection (CS bus line) 74. The auxiliary capacitor 72 is constituted by an auxiliary capacitor electrode that is electrically connected to a pixel electrode 68, an auxiliary capacitor counter electrode that is electrically connected to the auxiliary capacitor interconnection 74, and an insulating layer (not illustrated) that is provided between the auxiliary capacitor electrode and the auxiliary capacitor counter electrode.

In FIG. 7, a liquid crystal molecule 51 viewed from the normal direction of the liquid crystal panel 2 is described as having a conical shape. The vertex of the cone represents an end on a rear surface side (TFT substrate side) of the liquid crystal molecule 51. The bottom of the cone represents an end on a viewing side (color filter substrate side) of the liquid crystal molecule. In this embodiment, a director of the liquid crystal molecule 51 is defined as a direction from the end on the rear surface side of the liquid crystal molecule to the end on the viewing side thereof.

The pixel 50 employs four-domain VA having four domains 50a, 50b, 50c, and 50d. During application of a voltage, a liquid crystal molecule 51 that is included in a first domain 50a, a liquid crystal molecule 51 that is included in a second domain 50b, a liquid crystal molecule 51 that is included in a third domain 50c, and a liquid crystal molecule 51 that is included in a fourth domain 50d fall down in directions in which azimuth angles are different from each other by 90°. The liquid crystal molecules 51 which are included in the four domains 50a, 50b, 50c, and 50d will be described below in detail.

Figure 8:
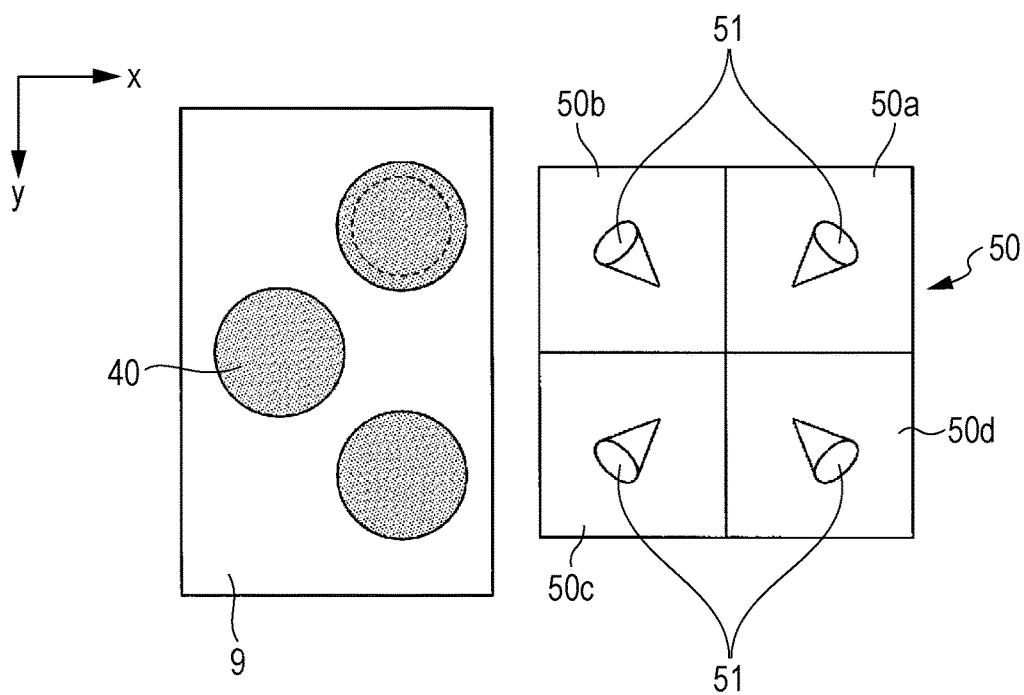
FIG. 8 is a schematic view illustrating an arrangement relationship between a pixel including a VA mode liquid crystal and the light control member.

FIG. 8 is a schematic view illustrating an arrangement relationship between the pixel 50 including VA mode liquid crystals, and the light control member 9 which are included in the liquid crystal display device 1. Actually, as illustrated in FIG. 1, the light control member 9 is disposed on the pixel 50, but in FIG. 8, the pixel 50 and the light control member 9 are described as being in parallel with each other for ease of explanation.

The liquid crystal molecules 51 which are included in the pixel 50 are aligned in an approximately vertical manner in a state in which a voltage is not applied thereto.

As illustrated in FIG. 8, the director of the liquid crystal molecule 51 that is included in the first domain 50a faces a direction of an azimuth angle $\phi$ of 45°, and is inclined in such a manner that the polar angle $\theta$ becomes greater than 0°. When aligning the liquid crystal molecule 51 as described above, at the central portion of the liquid crystal layer 11 in a thickness direction during application of a voltage in the first domain 50a, the liquid crystal molecule 51 falls down in such a manner that the azimuth angle $\phi$ becomes 45° and the polar angle becomes close to 90°.

The director of the liquid crystal molecule 51 that is included in the second domain 50b faces a direction of an azimuth angle $\phi$ of 135°, and is inclined in such a manner that the polar angle $\theta$ is greater than 0°. When aligning the liquid crystal molecule 51 as described above, at the central portion of the liquid crystal layer 11 in a thickness direction during application of a voltage in the second domain 50b, the liquid crystal molecule 51 falls down in such a manner that the azimuth angle $\phi$ becomes 135° and the polar angle becomes close to 90°.

The director of the liquid crystal molecule 51 that is included in the third domain 50c faces a direction of an azimuth angle $\phi$ of 225°, and is inclined in such a manner that the polar angle $\theta$ is greater than 0°. When aligning the liquid crystal molecule 51 as described above, at the central portion of the liquid crystal layer 11 in a thickness direction during application of a voltage in the third domain 50c, the liquid crystal molecule 51 falls down in such a manner that the azimuth angle $\phi$ becomes 225° and the polar angle becomes close to 90°.

The director of the liquid crystal molecule 51 that is included in the fourth domain 50d faces a direction of an azimuth angle $\phi$ of 315°, and is inclined in such a manner that the polar angle $\theta$ is greater than 0°. When aligning the liquid crystal molecule 51 as described above, at the central portion of the liquid crystal layer 11 in a thickness direction during application of a voltage in the fourth domain 50d, the liquid crystal molecule 51 falls down in such a manner that the azimuth angle $\phi$ becomes 315° and the polar angle becomes close to 90°.

As described above, the liquid crystal molecules 51 which are included in the first to fourth domains 50a to 50d are obliquely aligned in directions in which azimuth angles are different from each other by 90°. Accordingly, the liquid crystal molecules 51 which are included in the first to fourth domains 50a to 50d fall down in directions in which the azimuth angles are different from each other by 90° during application of a voltage. That is, with respect to an axis in a direction in which the azimuth angle $\phi$ is 0° or 180°, the liquid crystal molecule 51 that is included in the first domain 50a and the liquid crystal molecule 51 that is included in the fourth domain 50d fall down to be line symmetrical, and the liquid crystal molecule 51 that is included in the second domain 50b and the liquid crystal molecule 51 that is included in the third domain 50c fall down to be line symmetrical. In addition, with respect to an axis in a direction in which the azimuth angle $\phi$ is 90° or 270°, the liquid crystal molecule 51 that is included in the first domain 50a and the liquid crystal molecule 51 that is included in the first domain 50b fall down to be line symmetrical, and the liquid crystal molecule 51 that is included in the third domain 50c and the liquid crystal molecule 51 that is included in the fourth domain 50d fall down to be line symmetrical. That is, the liquid crystal molecules fall down to have line symmetry of two axes when viewed from the normal direction of the liquid crystal display device 1. In addition, liquid crystal molecules 51 in the vicinity of the first light distribution film 27 and the second light distribution film 34 remain in an approximately vertical state even during application of a voltage because light distribution thereof is regulated by the first light distribution film 27 and the second light distribution film 34.

In this embodiment, as illustrated in FIG. 8, the light control member 9 is disposed on a light-emitting side of the liquid crystal panel 2. As a result, rays of light, which are incident to the light control member 9 at polar angles $\theta$ which are different from each other, are mixed-in by the light control member 9. As a result, variations in luminance change depending on the polar angle $\theta$ are averaged, and as a result, variations in gamma characteristics depending on the polar angle $\theta$ are mitigated.

As described above, when combining the light control member 9 of this embodiment and the liquid crystal display device 1 employing the four-domain VA type, the viewing angle characteristics are improved.

(Method of Manufacturing Liquid Crystal Display Device)

FIGS. 9A to 9D are perspective views sequentially illustrating a process of manufacturing the light control member 9.

The manufacturing method is described with focusing on the process of manufacturing the light control member 9 that constitutes the liquid crystal display device 1 having the above-described configuration.

An outline of the process of manufacturing the liquid crystal panel 2 will be first described. First, the TFT substrate 10 and the color filter substrate 12 are prepared respectively. Then, a surface of the TFT substrate 10 on which the TFT 19 is formed and a surface of the color filter substrate 12 on which the color filter 31 is formed are disposed to face each other. The TFT substrate 10 and the color filter substrate 12 are bonded to each other through a sealing member. Then, liquid crystal is injected into a space surrounded by the TFT substrate 10, the color filter substrate 12, and the sealing member. The first retarder 4 and the first polarizing plate 3, and the second retarder 6 and the second polarizing plate 7 are bonded to both surfaces of the liquid crystal cell 5 prepared as described above, respectively, through an optical adhesive or the like. Through the above-described processes, the liquid crystal panel 2 is completed.

A method of manufacturing the TFT substrate 10 or the color filter substrate 12 may be executed in accordance with a typical method, and thus description thereof will be omitted.

Figure 9A:
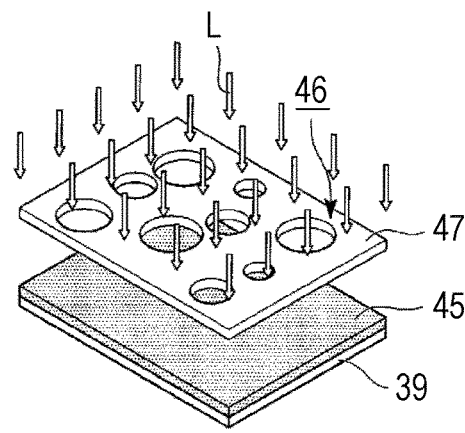
FIG. 9A is a perspective view illustrating a process of manufacturing the light control member according to the first embodiment of the invention.

A process of manufacturing the light control member 9 will be described. As illustrated in FIG. 9A, a triacetyl cellulose base material 39 having a thickness of 100 µm is prepared. Then, as a material of the light-shielding portion, a carbon-containing black negative resist is applied to one surface of the base material 39 by using a spin coating method. According to this, a coating 45 having a film thickness of 150 nm is formed.

The base material 39 on which the coating 45 is formed is placed on a hot plate, and pre-baking of the coating 45 is performed at a temperature of 90° C. According to this, a solvent in the black negative resist is volatilized.

The coating 45 is irradiated with light L through a photo-mask 47 in which a plurality of opening patterns 46 having, for example, a circular planar shape are formed by using an exposing apparatus so as to perform exposure. At this time, an exposing apparatus, which uses mixed rays of i-rays having a wavelength of 365 nm, h-rays having a wavelength of 404 nm, and g-rays having a wavelength of 436 nm, is used. The amount of exposure is set to 100 mJ/cm$^2$.

Figure 9B:
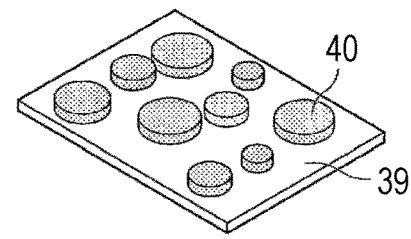
FIG. 9B is a perspective view illustrating a process of manufacturing the light control member according to the first embodiment of the invention.

After performing the exposure by using the photo-mask 47, the coating 45 formed from the black negative resist is developed by using a dedicated developing solution, and dried at 100° C., thereby forming the plurality of light-shielding layers 40 having, for example, a circular planar shape on the one surface of the base material 39 as illustrated in FIG. 9B. In the case of this embodiment, in the subsequent process, exposure with respect to a transparent negative resist is performed by using the light-shielding layers 40 formed from the black negative resist as a mask, thereby forming the hollow portions 42. According to this, a position of each of the opening patterns 46 in the photo-mask 47 corresponds to a position at which each of the hollow portions 42 is formed.

Each of the circular light-shielding layers 40 corresponds to a region (hollow portion 42) in which the light-diffusing portion 41 is not formed in the subsequent process.

All of the plurality of opening patterns 46 are circular patterns. The diameter of each of the opening patterns 46 varies. Arrangement of a gap (pitch) between the opening patterns 46 which are adjacent to each other is not regular and is not periodic. It is preferable that the gap (pitch) between the opening patterns 46 is smaller than a gap (pitch, for example, 150 µm) between pixels of the liquid crystal panel 2. According to this, at least one light-shielding layer 40 is formed in a pixel. Accordingly, for example, it is possible to realize a wide viewing angle when being combined with a liquid crystal panel having a small pixel pitch which is used, for example, in mobile apparatuses and the like.

In this embodiment, the light-shielding layers 40 are formed in accordance with a photolithography method using the black negative resist, but there is no limitation thereto. Other than this, when using a photo-mask in which the opening patterns 46 and light-shielding patterns of this embodiment are inverted from each other, a light-absorbing positive resist can be used. Alternatively, the light-shielding layers 40 can be directly formed by using a deposition method, a printing method, or the like.

Figure 9C:
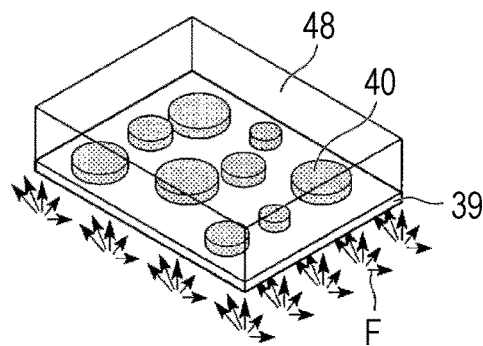
FIG. 9C is a perspective view illustrating a process of manufacturing the light control member according to the first embodiment of the invention.

Next, as illustrated in FIG. 9C, as a material of the light-diffusing portion, a transparent negative resist formed from an acrylic resin is applied onto the upper surface of the light-shielding layers 40 by using a spin coating method. According to this, the coating 48 having a film thickness of 20 µm is formed.

Next, the base material 39 on which the above-described coating 48 is formed is placed on a hot plate, and pre-baking of the coating 48 is performed at a temperature of 95° C. According to this, a solvent in the transparent negative resist is volatilized.

Then, the coating 48 is irradiated with light F from the base material 39 side by using the light-shielding layers 40 as a mask so as to perform exposure. At this time, an exposing apparatus, which uses mixed rays of i-rays having a wavelength of 365 nm, h-rays having a wavelength of 404 nm, and g-rays having a wavelength of 436 nm, is used. The amount of exposure is set to 500 mJ/cm$^2$.

Then, the base material 39 on which the above-described coating 48 is formed is placed on a hot plate, and post-exposure baking (PEB) of the coating 48 is performed at a temperature of 95° C.

Figure 9D:
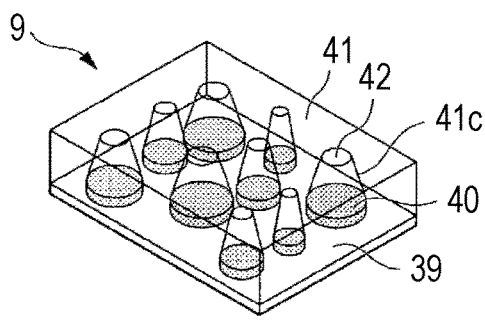
FIG. 9D is a perspective view illustrating a process of manufacturing the light control member according to the first embodiment of the invention.

Then, the coating 48 formed from the transparent negative resist is developed by using a dedicated developing solution, and post-baking is performed at 100° C., thereby forming the transparent resin layer 41 having the plurality of hollow portions 42 on the one surface of the base material 39 as illustrated in FIG. 9D. In this embodiment, as illustrated in FIG. 9C, exposure is performed by using diffused light, and thus the transparent negative resist that constitutes the coating 48 is radially exposed to be spread from a region in which the light-shielding layers 40 are not formed toward an outer side. According to this, the hollow portions 42 having a forward tapered shape are formed. The light-diffusing portion 41 has a reversed tapered shape. An inclination angle of the reflective surface 41c of the light-diffusing portion 41 can be controlled in accordance with a diffusion extent of the diffused light.

As the light F that is used herein, parallel light, diffused light, or light in which intensity at a specific emission angle is different from intensity at another emission angle, that is, light having strength or weakness at a specific emission angle can be used. In the case of using the parallel light, the inclination angle of the reflective surface 41c of the light-diffusing portion 41 becomes, for example, a single inclination angle of approximately 60° to 90°. In the case of using the diffused light, an inclined surface, in which the inclination angle continuously varies and a sectional shape is a curved shape, is obtained. In the case of using the light having strength or weakness at a specific emission angle, an inclined surface having an inclined surface angle, which corresponds to the strength or weakness, is obtained. As described above, the inclination angle of the reflective surface 41c of the light-diffusing portion 41 can be adjusted. According to this, it is possible to adjust the light diffusibility of the light control member 9 in order for an intended viewability to be obtained.

In addition, as a means for irradiating the base material 39 with parallel light emitted from the exposing apparatus as the light F, for example, a diffusing plate having a haze of approximately 50 is disposed on an optical path of light emitted from the exposing apparatus, and irradiation with light is performed through the diffusing plate.

Through the above-described processes in FIGS. 9A to 9D, the light control member 9 of this embodiment is completed.

It is preferable that total light transmittance of the light control member 9 is 90% or greater. When the total light transmittance is 90% or greater, it is possible to obtain sufficient transparency, and thus it is possible to sufficiently exhibit optical performance which is desirable for the light control member 9.

The total light transmittance is regulated in accordance with JIS K7361-1. In addition, in this embodiment, a case of using a liquid resist is exemplified as an example. However, instead of this configuration, a film-shaped resist may be used.

Finally, as illustrated in FIG. 1, the light control member 9 that is completed is bonded to the liquid crystal panel 2 through the adhesive layer 43 in a state in which the base material 39 faces the viewing side, and the light-diffusing portion 41 faces the second polarizing plate 7.

Through the above-described processes, the liquid crystal display device 1 of this embodiment is completed.

In the liquid crystal display device 1 according to this embodiment, the light control member 9 is disposed on a light emitting side of the liquid crystal panel 2, and thus light that is incident to the light control member 9 is emitted from the light control member 9 in a state in which an angle distribution is widened from an angle distribution prior to incidence to the light control member 9. Accordingly, even when a visual line of an observer is inclined from a front direction (normal direction) of the liquid crystal display device 1, the observer can view satisfactory display.

In general, in a case where regular patterns such as a striped pattern and a lattice pattern are overlapped each other, when periods of respective patterns slightly deviate from each other, it is known that an interference fringe pattern (moire) is visually recognized. For example, when assuming that a light control member in which a plurality of light-diffusing portions are arranged in a matrix shape, and a liquid crystal panel in which a plurality of pixels are arranged in a matrix shape are overlapped each other, there is a concern that the moire occurs between a periodic pattern of the light-diffusing portions of the light control member and a periodic pattern of the pixels of the liquid crystal panel, and thus the moire may deteriorate the display quality.

In contrast, in the liquid crystal display device 1 according to this embodiment, the plurality of light-shielding layers 40 are randomly arranged in a plan view. The light-diffusing portion 41 is formed in a region other than a region in which the light-shielding layers 40 are formed. According to this, moire due to interference with the regular arrangement of the pixels of the liquid crystal panel 2 does not occur, and thus it is possible to maintain a display quality.

In this embodiment, the plurality of light-shielding layers 40 are randomly arranged, but it is not particularly desired for the arrangement of the plurality of light-shielding layers 40 to be random. As long as the arrangement of the plurality of light-shielding layers 40 is non-periodic, it is possible to suppress occurrence of the moire. In addition, in a case where the occurrence of some moire is permissible in accordance with a situation or a usage, the plurality of light-shielding layers 40 may be periodically arranged.

Second Embodiment

Hereinafter, a second embodiment of the invention will be described with reference to FIG. 10.

The basic configuration of a liquid crystal display device of this embodiment is the same as in the first embodiment except that a plurality of light-diffusing portions 341 are arranged in a light control member 309. According to this, in this embodiment, the light control member 309 will be described.

FIG. 10 is a top view of the light control member 309. As illustrated in FIG. 10, in the light control member 309 of this embodiment, a plurality of light-diffusing portions 341 are provided on one surface of the base material in a scattered manner. The planar shape of the light-diffusing portion 341 viewed from the normal direction of the base material is a circular shape.

A portion, which corresponds to a lower side of a light-shielding layer 340, becomes a hollow portion 342. Air exists in the hollow portion 342. The light control member 309 includes the hollow portion 342 which is continuous and in which air exists.

The light-diffusing portions 341 are provided in a scattered manner at a portion other than the hollow portion 342.

In this embodiment, the light control member 309 is disposed on a light-emitting side of the liquid crystal panel 2. Even when using the light control member 309, a variation in the gamma characteristics when obliquely viewing the display screen is suppressed, and thus it is possible to realize a display image excellent in viewing angle characteristics.

In addition, the planar shape of the light-diffusing portion 341 may include shapes such as a circular shape, a polygonal shape, and a semi-circular shape. In addition, parts of the openings of the light-diffusing portion 341 may be formed to overlap each other.

Third Embodiment

Hereinafter, a second embodiment of the invention will be described with reference to FIG. 11A to FIG. 11E.

The basic configuration of a liquid crystal display device of this embodiment is the same as in the first embodiment except for the shape of the light-shielding layer in the light control member.

Accordingly, in this embodiment, description of the basic configuration of the liquid crystal display device will be omitted, and the light-shielding layer will be described.

FIG. 11A to FIG. 11E are plan views of the light-shielding layer of this embodiment.

As illustrated in FIG. 11A to FIG. 11E, the shape of the light-shielding layer of this embodiment is a shape having line symmetry in two axes or more.

Figure 11A:
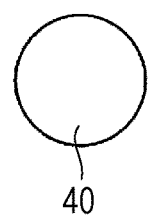
FIG. 11A is a plan view of a light-shielding layer according to a third embodiment of the invention.
Figure 11B:
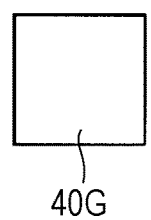
FIG. 11B is a plan view of the light-shielding layer according to the third embodiment of the invention.
Figure 11C:
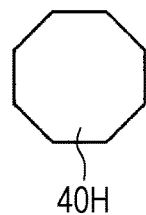
FIG. 11C is a plan view of the light-shielding layer according to the third embodiment of the invention.
Figure 11D:
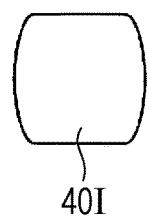
FIG. 11D is a plan view of the light-shielding layer according to the third embodiment of the invention.
Figure 11E:
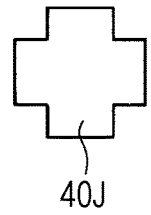
FIG. 11E is a plan view of the light-shielding layer according to the third embodiment of the invention.

In the first embodiment, as illustrated in FIG. 11A, an example of the light-shielding layer 40 in which the planar shape is a circular shape is described. However, for example, as illustrated in FIG. 11B, a light-diffusing portion 40G, in which the planar shape is a square shape, may be used. Alternatively, as illustrated in FIG. 11C, a light-diffusing portion 40H, in which the planar shape is a regular octagonal shape, may be used. Alternatively, as illustrated in FIG. 11D, a light-diffusing portion 40I having a shape in which two facing sides of a square are curved toward an outer side may be used. Alternatively, as illustrated in FIG. 11E, a light-diffusing portion 40J having a shape, in which two rectangles intersect each other in two directions perpendicular to each other, may be used. In addition, the shapes in FIG. 11B to FIG. 11E may rotate in a plurality of directions. For example, in the case of the light-diffusing portion 40G having the square shape illustrated in FIG. 11B, light diffuses toward a direction perpendicular to each side of the square.

Even when using the light-shielding layer described in this embodiment, as is the case with the first embodiment, rays of light, which are incident to the light control member 9 at polar angles θ different from each other, are mixed-in by the light control member 9. As a result, variations in luminance change depending on the polar angle θ are averaged, and as a result, variations in gamma characteristics depending on the polar angle θ are mitigated.

Fourth Embodiment

Hereinafter, a fourth embodiment of the invention will be described with reference to FIG. 12A, FIG. 12B, FIG. 13A, and FIG. 13B.

The basic configuration of a liquid crystal display device of this embodiment is the same as in the first embodiment except for a configuration of a reflective surface of the light-diffusing portion in the light control member.

Accordingly, in this embodiment, description of the basic configuration of the liquid crystal display device will be omitted, and the light control member will be described.

Figure 12A:
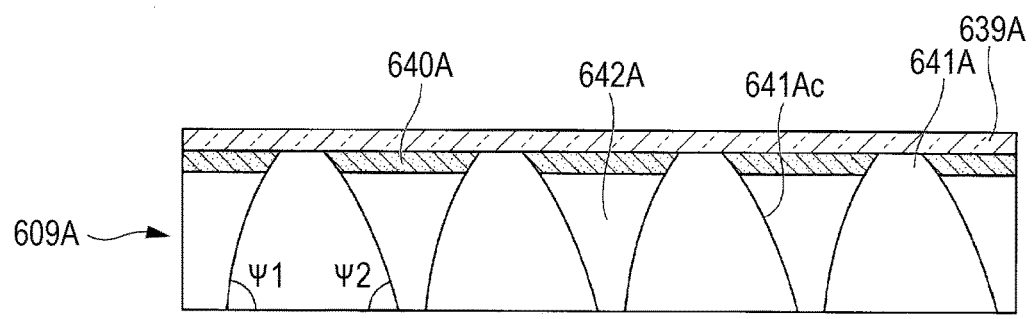
FIG. 12A is a cross-sectional view of a light control member according to a fourth embodiment of the invention.
Figure 12B:
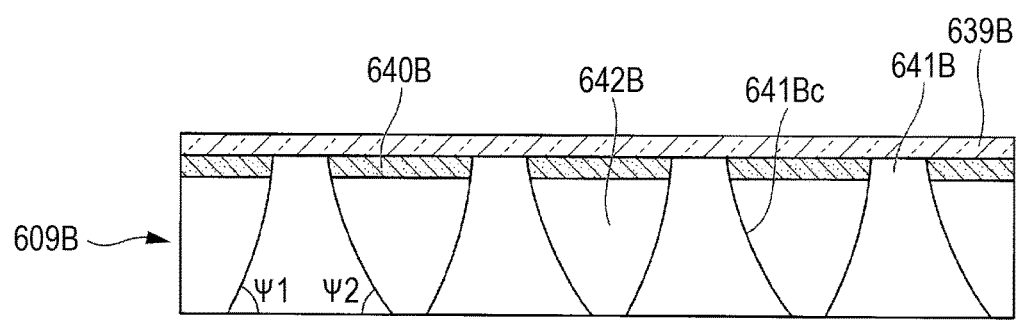
FIG. 12B is a cross-sectional view of the light control member according to the fourth embodiment of the invention.

FIG. 12A and FIG. 12B are sectional views of light control members 609A and 609B of this embodiment.

As illustrated in FIG. 12A and FIG. 12B, the light control members 609A and 609B of this embodiment are different from the light control member 9 of the first embodiment in the configuration of the reflective surface of light-diffusing portions 641A and 641B.

Specifically, in the light control member 9 of the first embodiment, the inclination angle of the reflective surface 41c of each of the light-diffusing portions 40 is constant. In contrast, in the light control members 609A and 609B illustrated in FIGS. 12A and 12B, an inclination angle of a reflective surface of each of the light-diffusing portions 641A and 641B continuously varies. The reflective surface of each of the light-diffusing portions 641A and 641B is an inclined surface having a curved sectional shape.

In the light control member 609A illustrated in FIG. 12A, a reflective surface 641Ac of the light-diffusing portion 641A is curved toward a hollow portion 642A side, and a portion on a reflective surface 641Ac side of the hollow portion 642A is formed in a concave shape.

In the light control member 609B illustrated in FIG. 12B, a reflective surface 641Bc of the light-diffusing portion 641B is curved toward a hollow portion 642B side, and a portion on a reflective surface 641Bc side of the hollow portion 642B is formed in a convex shape.

Figure 13A:
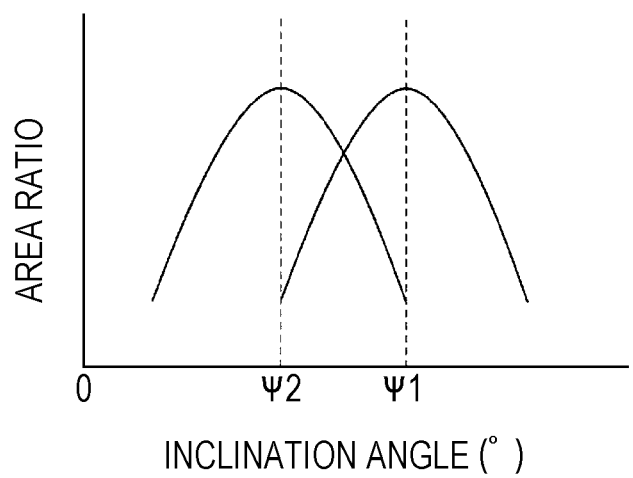
FIG. 13A is a view illustrating a relationship between an inclination angle of a reflective surface of a light-diffusing portion, and an area ratio.
Figure 13B:
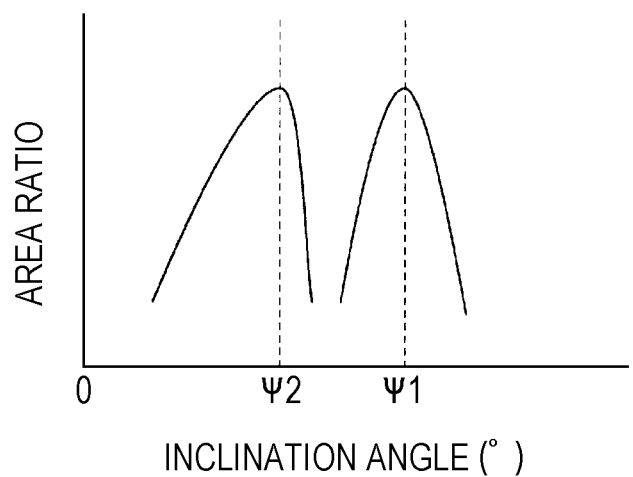
FIG. 13B is a view illustrating a relationship between the inclination angle of the reflective surface of the light-diffusing portion, and an area ratio.

FIGS. 13A and 13B are views for describing a relationship between the inclination angle of the reflective surface of the light-diffusing portion and an area ratio.

FIG. 13A is a view illustrating a case where an inclination angle distribution of the reflective surface of the light-diffusing portion is the same in each of a first reflective surface and a second reflective surface. FIG. 13B is a view illustrating a case where the inclination angle distribution of the reflective surface of the light-diffusing portion is different between the first reflective surface and the second reflective surface. In FIGS. 13A and 13B, the horizontal axis represents the inclination angle of the reflective surface of the light-diffusing portion. The vertical axis represents an area ratio of the reflective surface of the light-diffusing portion. The area ratio represents a ratio of an area of a portion having a predetermined inclination angle to a total area of the reflective surface when viewing the reflective surface of the light-diffusing portion from a lateral side. In this embodiment, the reflective surface is curved, and thus the inclination angle becomes an angle made by a tangential line at a predetermined position of a curved portion of the reflective surface, and the light-incident end surface of the light-diffusing portion. Here, a case is described where an inclination angle ψ1 of the first reflective surface is larger than an inclination angle ψ2 of the second reflective surface, as an example.

In this embodiment, the inclination angle of the reflective surface of the light-diffusing portion has an angle distribution width centering around a main inclination angle. As illustrated in FIG. 13A, the inclination angle distribution of the reflective surface of the light-diffusing portion may be the same inclination distribution in both the inclination angle ψ1 of the first reflective surface and the inclination angle ψ2 of the second reflective surface. In addition, as illustrated in FIG. 13B, the inclination angle distribution may be a different inclination distribution between the inclination angle ψ1 of the first reflective surface and the inclination angle ψ2 of the second reflective surface.

However, the inclination angle ψ1 of the first reflective surface has greater contribution to the degree of symmetry in a luminance distribution in comparison to the inclination angle ψ2 of the second reflective surface. According to this, it is desirable that the distribution of the inclination angle ψ1 of the first reflective surface is narrow in order to improve the symmetry in the luminance distribution.

In this embodiment, the light control member 609A or 609B is disposed on a light-emitting side of the liquid crystal panel 2. Even when using the light control member 609A or 609B, a variation in the gamma characteristics when obliquely viewing the display screen is suppressed, and thus it is possible to realize a display image excellent in the viewing angle characteristics.

Fifth Embodiment

Hereinafter, a fifth embodiment of the invention will be described with reference to FIGS. 14A and 14B.

The basic configuration of a liquid crystal display device of this embodiment is the same as in the fourth embodiment except for the configuration of the reflective surface of the light-diffusing portion in the light control member.

Accordingly, in this embodiment, description of the basic configuration of the liquid crystal display device will be omitted, and the light control member will be described.

Figure 14A:
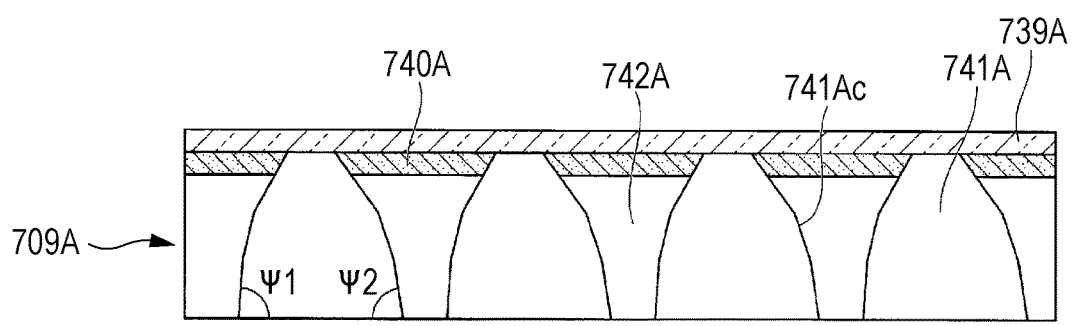
FIG. 14A is a cross-sectional view of a light control member according to a fifth embodiment of the invention.
Figure 14B:
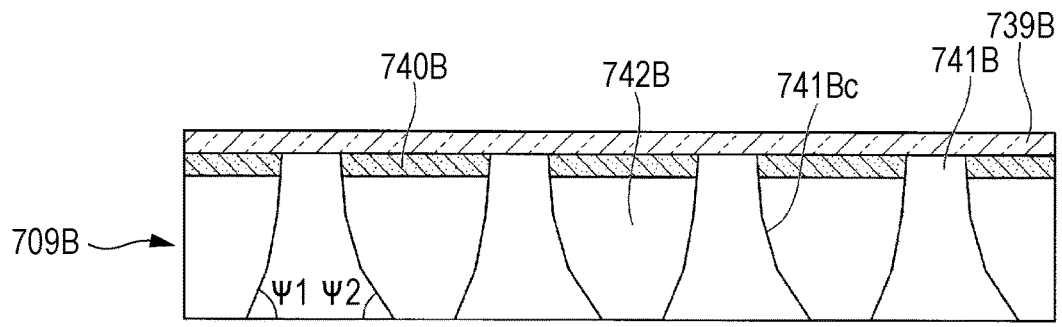
FIG. 14B is a cross-sectional view of the light control member according to the fifth embodiment of the invention.

FIGS. 14A and 14B are cross-sectional views of light control members 709A and 709B of this embodiment.

As illustrated in FIGS. 14A and 14B, the light control members 709A and 709B of this embodiment are different from the light control members 609A and 609B of the fourth embodiment in the configuration of the reflective surface of the light-diffusing portion.

Specifically, in the light control members 609A and 609B of the fourth embodiment, the inclination angle of the reflective surface of each of the light-diffusing portions 641A and 641B continuously varies, and the reflective surface of each of the light-diffusing portions 641A and 641B is an inclined surface having a curved sectional shape. In contrast, in the light control members 709A and 709B illustrated in FIGS. 14A and 14B, the reflective surface of each of the light-diffusing portions 741A and 741B has a plurality of inclination angles different from each other. The reflective surface of each of the light-diffusing portions 741A and 741B is an inclined surface having a bent-line sectional shape.

In the light control member 709A illustrated in FIG. 14A, a reflective surface 741Ac of the light-diffusing portion 741A has three inclined surfaces in which inclination angles are different from each other, and a portion on a reflective surface 741Ac side of a hollow portion 742A is formed in a concave shape.

In the light control member 709B illustrated in FIG. 14B, a reflective surface 741Bc of the light-diffusing portion 741B has three inclined surfaces in which inclination angles are different from each other, and a portion on a reflective surface 741Bc side of a hollow portion 742B is formed in a convex shape.

Even when using the light control members 709A and 709B of this embodiment, a variation in the gamma characteristics when obliquely viewing the display screen is suppressed, and thus it is possible to realize a display image excellent in the viewing angle characteristics.

Sixth Embodiment

Hereinafter, a sixth embodiment of the invention will be described with reference to FIG. 15 to FIG. 19.

The basic configuration of a liquid crystal display device of this embodiment is the same as in the first embodiment except for the configuration of the pixel of the liquid crystal panel 2. The liquid crystal panel 2 of this embodiment has a pixel configuration that employs a so-called multi-pixel drive.

Accordingly, in this embodiment, description of the basic configuration of the liquid crystal display device will be omitted, and the pixel of the liquid crystal panel 2 will be described.

Figure 15:
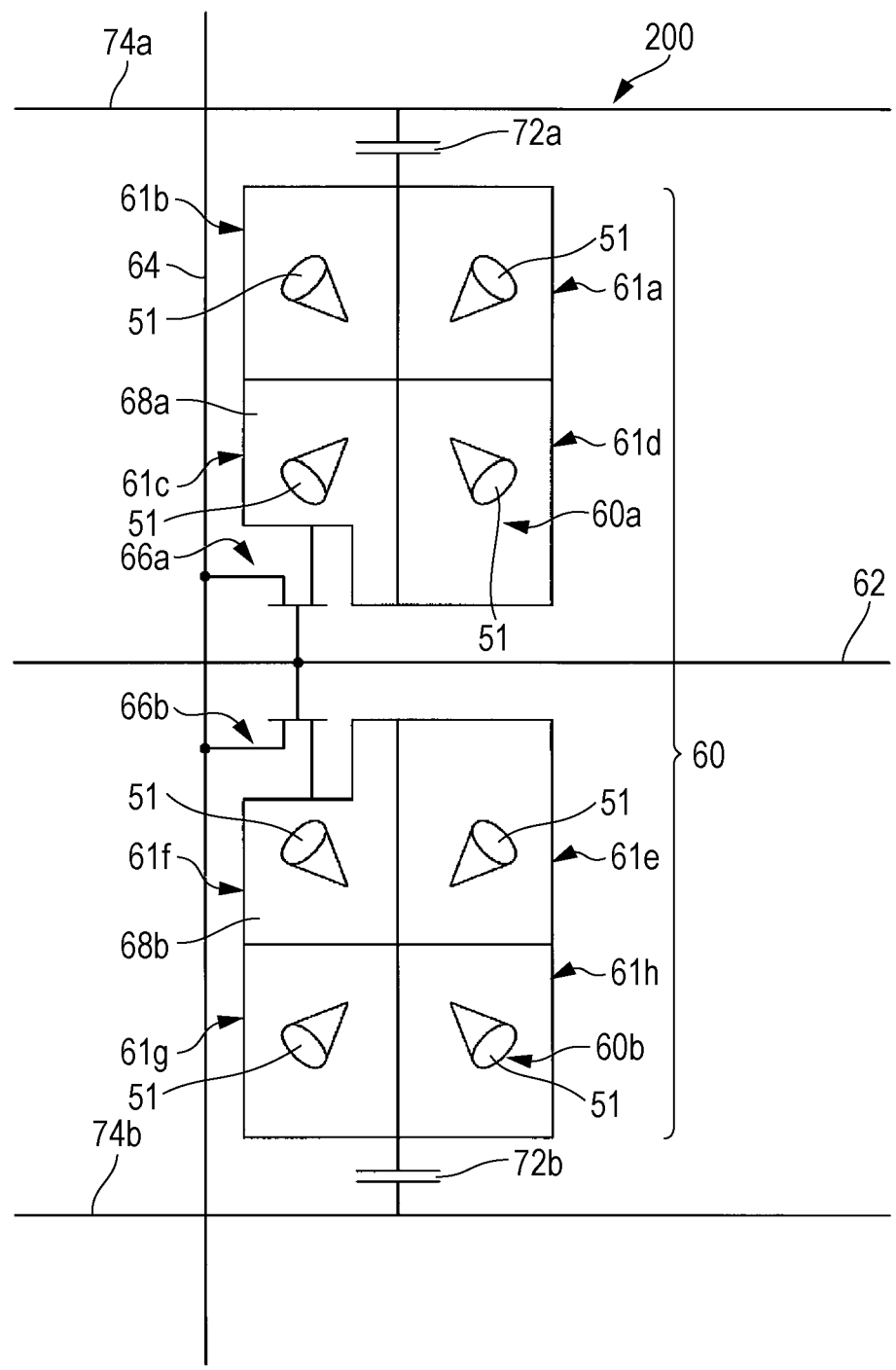
FIG. 15 is a schematic view illustrating an electrical configuration of a liquid crystal display device according to a sixth embodiment of the invention.

FIG. 15 schematically illustrates an electrical configuration of one pixel of a liquid crystal display device 200 of this embodiment.

A pixel 60 is divided into sub-pixels 60a and 60b. A TFT 66a and an auxiliary capacitor (CS) 72a are connected to the sub-pixel 60a. A TFT 66b and an auxiliary capacitor 72b are connected to the sub-pixel 60b. A gate electrode of each of the TFT 66a and the TFT 66b is connected to a scanning line 62. Each source electrode thereof is connected to a common (same) signal line 64. The auxiliary capacitors 72a and 72b are connected to an auxiliary capacitor interconnection (CS bus line) 74a and an auxiliary capacitor interconnection 74b, respectively. Each of the auxiliary capacitors 72a and 72b is formed by a corresponding one of auxiliary capacitor electrodes that are electrically connected to sub-pixel electrodes 68a and 68b, an auxiliary capacitor counter electrode that is electrically connected to corresponding one of the auxiliary capacitor interconnections 74a and 74b, and an insulating layer (not shown) that is interposed between the electrodes. The auxiliary capacitor counter electrodes of the auxiliary capacitors 72a and 72b are independent from each other, and auxiliary capacitor counter voltages, which are different from each other, can be supplied thereto from the auxiliary capacitor interconnections 74a and 74b, respectively.

The sub-pixel 60a has four domains 61a, 61b, 61c, and 61d. During application of a voltage, a liquid crystal molecule 51 that is included in the domain 61a, a liquid crystal molecule 51 that is included in the domain 61b, a liquid crystal molecule 51 that is included in the domain 61c, and a liquid crystal molecule 51 that is included in the domain 61d fall down in directions in which azimuth angles are different from each other by 90°.

Similarly, the sub-pixel 60b has four domains 61e, 61f, 61g, and 61h. During application of a voltage, a liquid crystal molecule 51 that is included in the domain 61e, a liquid crystal molecule 51 that is included in the domain 61f, a liquid crystal molecule 51 that is included in the domain 61g, and a liquid crystal molecule 51 that is included in the domain 61h fall down in directions in which azimuth angles are different from each other by 90°.

Next, the principle with which it is possible to apply effective voltages, which are different from each other, to liquid crystal layers of the two sub-pixels 60a and 60b of the liquid crystal display device 200 is described with reference to FIG. 16.

Figure 16:
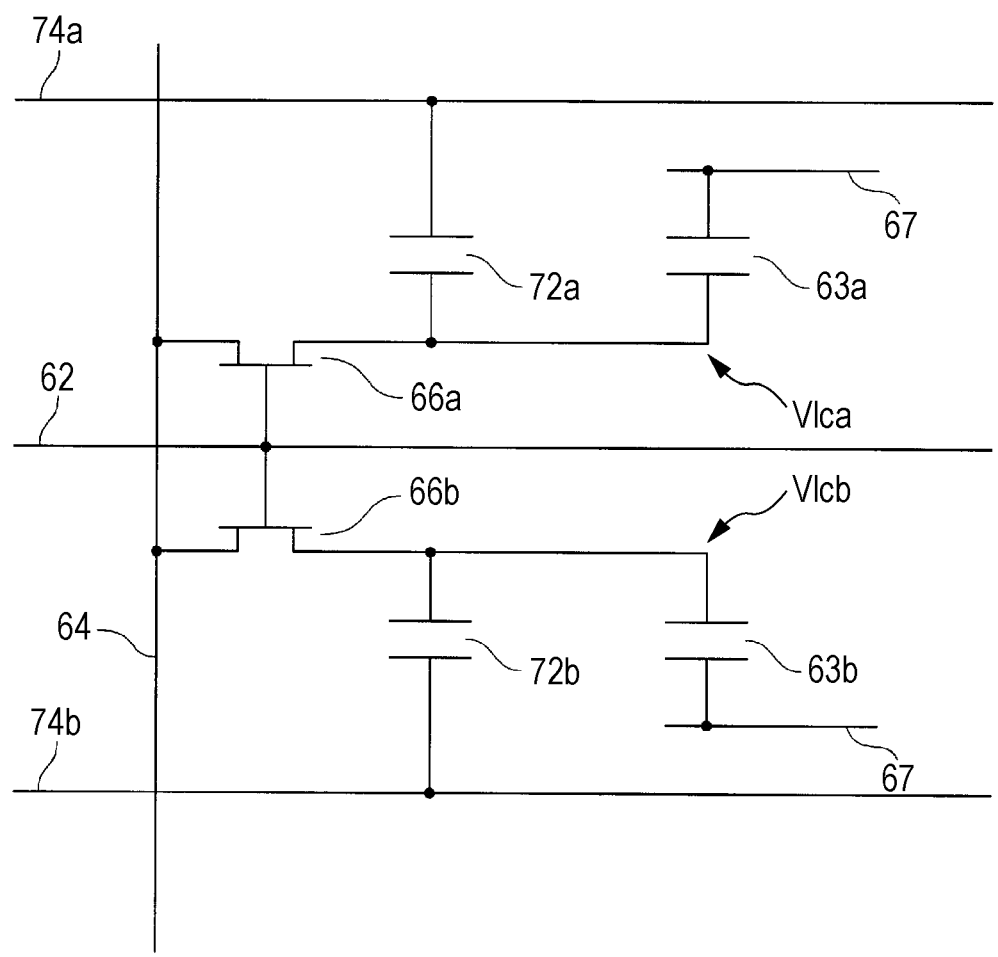
FIG. 16 is an equivalent circuit diagram corresponding to one pixel of the liquid crystal display device according to the sixth embodiment of the invention.

FIG. 16 schematically illustrates an equivalent circuit for each pixel of the liquid crystal display device 200. In an electrical equivalent circuit, the liquid crystal layers of the sub-pixels 60a and 60b are illustrated as liquid crystal layers 63a and 63b. In addition, liquid crystal capacitors, which are formed by the sub-pixel electrodes 68a and 68b, the liquid crystal layers 63a and 63b, and a counter electrode 67 (common to the sub-pixels 60a and 60b), are set as Clca and Clcb, respectively.

An electrostatic capacitance value of the liquid crystal capacitors Clca and Clcb is set to the same value CLC (V). The value of CLC (V) depends on an effective voltage (V) that is applied to the liquid crystal layers of the sub-pixels 60a and 60b. In addition, the auxiliary capacitors 72a and 72b, which are independently connected to the liquid crystal capacitors of the sub-pixels 60a and 60b, are set as Ccsa and Ccsb, respectively, and an electrostatic capacitance value thereof is set to the same value CCS.

One electrode of the auxiliary capacitor Ccsa of the sub-pixel 60a is a sub-pixel electrode. The sub-pixel electrode 68a of the liquid crystal capacitor Clca and the sub-pixel electrode of the auxiliary capacitor Ccsa are connected to a drain electrode of the TFT 66a that is provided to drive the sub-pixel 60a. The other electrode of the liquid crystal capacitor Clca is a counter electrode. The other electrode of the auxiliary capacitor Ccsa is connected to the auxiliary capacitor interconnection 74a. One electrode of the auxiliary capacitor Ccsb of the sub-pixel 60b is a sub-pixel electrode. The sub-pixel electrode 68b of the liquid crystal capacitor Clcb and the sub-pixel electrode of the auxiliary capacitor Ccsb are connected to a drain electrode of the TFT 66b that is provided to drive the sub-pixel 60b. The other electrode of the liquid crystal capacitor Clcb is the counter electrode. The other electrode of the auxiliary capacitor Ccsb is connected to the auxiliary capacitor interconnection 74b. All of the gate electrodes of the TFT 66a and TFT 66b are connected to the scanning line 62. All of the source electrodes thereof are connected to the signal line 64.

Figure 17:
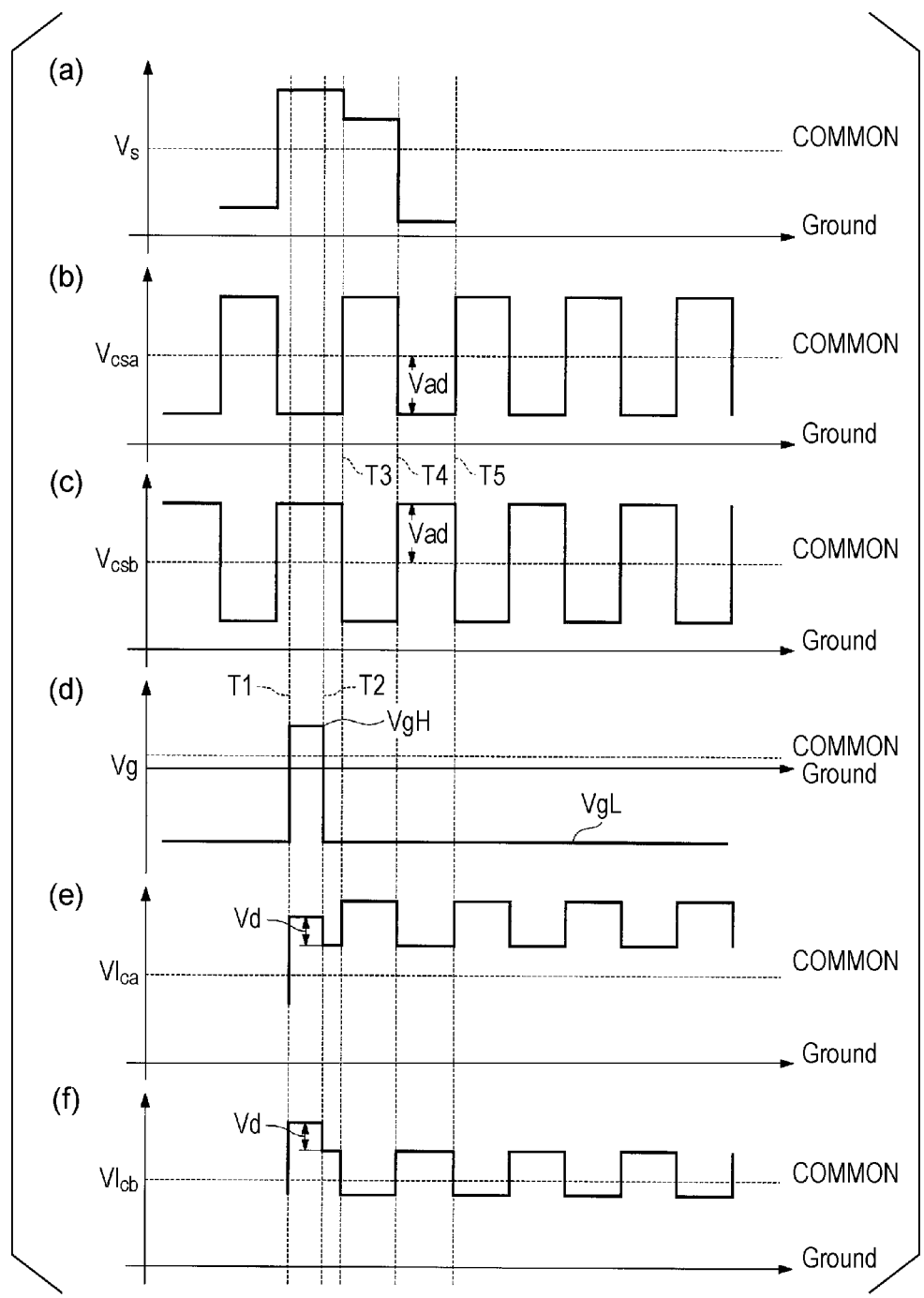
FIG. 17 is a timing chart of each voltage when driving the liquid crystal display device 200 according to the sixth embodiment of the invention.

Timing of each voltage when driving the liquid crystal display device 200 of this embodiment is schematically illustrated in (a) to (f) of FIG. 17.

(a) of FIG. 17 illustrates a voltage waveform Vs of the signal line 64. (b) of FIG. 17 illustrates a voltage waveform Vcsa of the auxiliary capacitor interconnection 74a. (c) of FIG. 17 illustrates a voltage waveform Vcsb of the auxiliary capacitor interconnection 74b. (d) of FIG. 17 illustrates a voltage waveform Vg of the scanning line 62. (e) of FIG. 17 illustrates a voltage waveform Vlca of the pixel electrode 68a of the sub-pixel 60a. (f) of FIG. 17 illustrates a voltage waveform Vlcb of the pixel electrode 68b of the sub-pixel 60b. In addition, broken lines in the drawing represent a voltage waveform COMMON (Vcom) of the counter electrode 67.

Hereinafter, an operation of the equivalent circuit of FIG. 16 will be described with reference to (a) to (f) of FIG. 17.

At time T1, when a voltage of Vg varies from VgL to VgH, the TFT 66a, the TFT 66b simultaneously enter a conduction state (ON-state), and thus the voltage Vs of the signal line 64 is transmitted to the sub-pixel electrodes 68a and 68b of the sub-pixels 60a and 60b, and is charged in the sub-pixels 60a and 60b. Similarly, charging from the signal line is also performed in the auxiliary capacitors Csa and Csb of the sub-pixels.

At time T2, when the voltage Vg of the scanning line 62 varies from VgH to VgL, the TFT 66a and the TFT 66b simultaneously enter a non-conduction state (OFF-state), and thus the sub-pixels 60a and 60b and the auxiliary capacitors Csa and Csb are electrically insulated from the signal line 64. In addition, the voltages Vlca and Vlcb of the sub-pixel electrodes decrease by approximately the same voltage Vd immediately after the insulation due to a pull-in phenomenon that is caused by an effect of, for example, a parasitic capacitance of the TFT 66a and TFT 66b. The voltages Vlca and Vlcb are expressed by the following Equations.

$$Vlca = Vs - Vd \quad (1)$$

$$Vlcb = Vs - Vd \quad (2)$$

In addition, the voltages Vcsa and Vcsb of the auxiliary capacitor interconnections are expressed by the following Equations.

$$Vcsa = Vcom - Vad \quad (3)$$

$$Vcsb = Vcom + Vad \quad (4)$$

At time T3, the voltage Vcsa of the auxiliary capacitor interconnection 74a that is connected to the auxiliary capacitor Csa varies from the Vcom−Vad to Vcom+Vad, and the voltage Vcsb of the auxiliary capacitor interconnection 74b that is connected to the auxiliary capacitor Csb varies from Vcom+Vad to Vcom−Vad by two times the Vad. The voltages Vlca and Vlcb of the sub-pixel electrodes vary as follows in accordance with the voltage variation in the auxiliary capacitor interconnections 74a and 74b.

$$Vlca = Vs - Vd + 2 \times K \times Vad \quad (5)$$

$$Vlcb = Vs - Vd - 2 \times K \times Vad \quad (6)$$

where a relationship of K=CCS/(CLC (V)+CCS) is established.

At time T4, Vcsa varies from Vcom+Vad to Vcom−Vad, and Vcsb varies from Vcom−Vad to Vcom+Vad by two times the Vad in each case, and thus Vlca and Vlcb vary from Equation (7) and Equation (8) to Equation (9) and Equation (10), respectively.

$$Vlca = Vs - Vd + 2 \times K \times Vad \quad (7)$$

$$Vlcb = Vs - Vd - 2 \times K \times Vad \quad (8)$$

$$Vlca = Vs - Vd \quad (9)$$

$$Vlcb = Vs - Vd \quad (10)$$

At time T5, Vcsa varies from Vcom−Vad to Vcom+Vad, and Vcsb varies from Vcom+Vad to Vcom−Vad by two times the Vad, and thus Vlca and Vlcb also vary from Equation (11) and Equation (12) to Equation (13) and Equation (14), respectively.

$$Vlca = Vs - Vd \quad (11)$$

$$Vlcb = Vs - Vd \quad (12)$$

$$Vlca = Vs - Vd + 2 \times K \times Vad \quad (13)$$

$$Vlcb = Vs - Vd - 2 \times K \times Vad \quad (14)$$

In Vcsa, Vcsb, Vlca, and Vlcb, the variations at T4 and T5 are alternately repeated for an interval that is an integral multiple of horizontal writing time 1H. Whether or not a repetition interval of the variations at T4 and T5 is set to an interval of one time the interval of 1H, two times the interval of 1H, or three or more times the interval of 1H may be approximately determined in consideration of a method of driving (polarity inverting method or the like) a liquid crystal display device, and a display state (flickering, feeling of variation in display or the like). The repetition continues until the pixel 60 is subsequently updated, that is, until reaching time that is equivalent to T1. Accordingly, effective values of the voltages Vlca and Vlcb of the sub-pixel electrodes become as follows.

$$Vlca = Vs - Vd + K \times Vad \quad (15)$$

$$Vlcb = Vs - Vd - K \times Vad \quad (16)$$

Accordingly, the effective voltages V1 and V2 which are applied to the liquid crystal layers 13a and 13b of the sub-pixels 60a and 60b are expressed as follows.

$$V1 = Vlca - Vcom \quad (17)$$

$$V2 = Vlcb - Vcom \quad (18)$$

That is, the effective voltages V1 and V2 can be updated as follows.

$$V1 = Vs - Vd + K \times Vad - Vcom \quad (19)$$

$$V2 = Vs - Vd - K \times Vad - Vcom \quad (20)$$

Accordingly, a difference $\Delta V12$ (=V1−V2) between the effective voltages which are applied to the liquid crystal layers 13a and 13b of the sub-pixels 60a and 60b satisfies a relationship of $\Delta V12 = 2 \times K \times Vad$ (where K=CCS/(CLC(V)+ CCS)), and thus application of voltages different from each other is possible.

In this embodiment, the liquid crystal display device 200 having the above-described configuration and the light control member 9 are combined. As is the case with the first embodiment, rays of light, which are incident to the light control member 9 at polar angles θ different from each other, are mixed-in by the light control member 9. As a result, variations in luminance change depending on the polar angle θ are averaged, and as a result, variations in gamma characteristics depending on the polar angle θ are mitigated.

Figure 18:
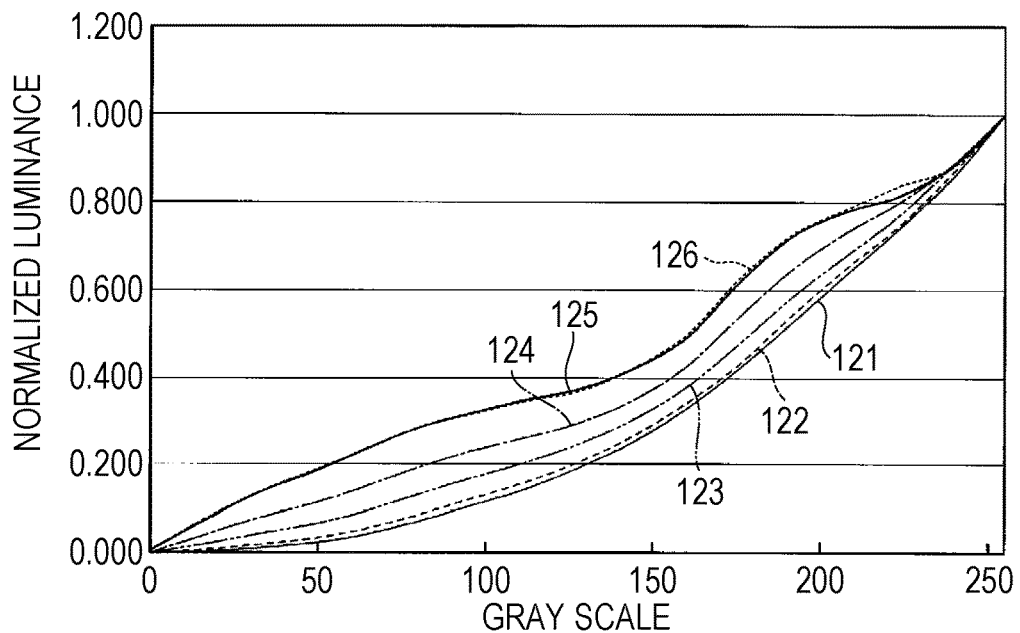
FIG. 18 is a view illustrating gamma characteristics in the case of changing the polar angle $\theta$ at an azimuth angle $\phi$ of 0° in a multi-pixel drive liquid crystal display device that does not include the light control member.

FIG. 18 is a view illustrating gamma characteristics in the case of changing the polar angle θ at the azimuth angle φ of 0° in a multi-pixel drive liquid crystal display device that does not include the light control member. In FIG. 18, the horizontal axis represents a gray scale, and the vertical axis represents normalized luminance. In FIG. 18, a reference numeral 121 represents gamma characteristics at a polar angle θ of 0°. A reference numeral 122 represents gamma characteristics at a polar angle θ of 15°. A reference numeral 123 represents gamma characteristics at a polar angle θ of 30°. A reference numeral 124 represents gamma characteristics at a polar angle θ of 45°. A reference numeral 125 represents gamma characteristics at a polar angle θ of 60°. A reference numeral 126 represents gamma characteristics at a polar angle θ of 75°. It can be seen that the gamma characteristics vary depending on the polar angle θ as illustrated in FIG. 18.

Figure 19:
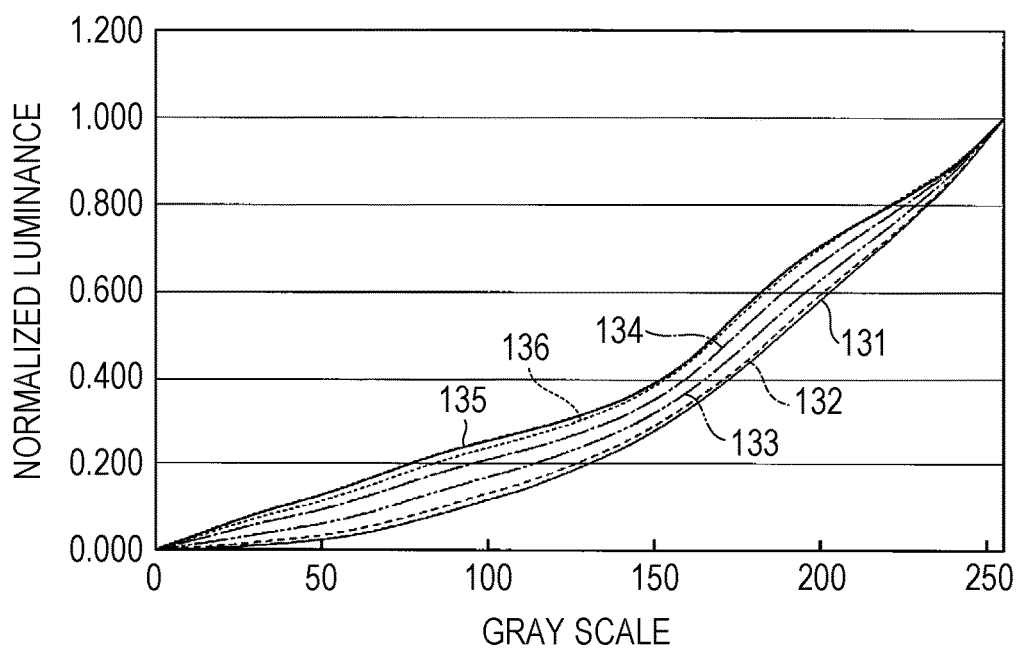
FIG. 19 is a view illustrating gamma characteristics in the case of changing the polar angle $\theta$ at an azimuth angle $\phi$ of 0° in the liquid crystal display device according to the sixth embodiment of the invention.

FIG. 19 is a view illustrating gamma characteristics in the case of changing the polar angle θ at an azimuth angle φ of 0° in the liquid crystal display device 200 according to this embodiment. In FIG. 19, the horizontal axis represents a gray scale, and the vertical axis represents normalized luminance. In FIG. 19, a reference numeral 131 represents gamma characteristics at a polar angle θ of 0°. A reference numeral 132 represents gamma characteristics at a polar angle θ of 15°. A reference numeral 133 represents gamma characteristics at a polar angle θ of 30°. A reference numeral 134 represents gamma characteristics at a polar angle θ of 45°. A reference numeral 135 represents gamma characteristics at a polar angle θ of 60°. A reference numeral 136 represents gamma characteristics at a polar angle θ of 75°. It can be seen that a variation in the gamma characteristics depending on the polar angle θ decreases in comparison to the multi-pixel drive liquid crystal display device that does not include the light control member illustrated in FIG. 18. Particularly, it can be seen that the gamma characteristics at the polar angle θ of 30° or greater are close to the gamma characteristics at the polar angle θ of 0°. From these results, it can be seen that in the case of viewing the liquid crystal display device 1 from an oblique direction at the azimuth angle ϕ of 0°, color variation is mitigated.

In addition, other multi-pixel drive methods are applicable to this embodiment without limitation to the multi-pixel drive method that is used in this embodiment. For example, pixel configurations, which are described in Japanese Unexamined Patent Application Publication No. 2006-48055, Japanese Unexamined Patent Application Publication No. 2006-133577, Japanese Unexamined Patent Application Publication No. 2009-199067, and International Publication No. 2008/18552, may be used.

Seventh Embodiment

Hereinafter, a seventh embodiment of the invention will be described with reference to FIG. 20 to FIG. 26.

The basic configuration of a liquid crystal display device of this embodiment is the same as in the first embodiment except for a configuration of the light control member.

Accordingly, in this embodiment, description of the basic configuration of the liquid crystal display device will be omitted, and a light control member 9A will be described.

Figure 20:
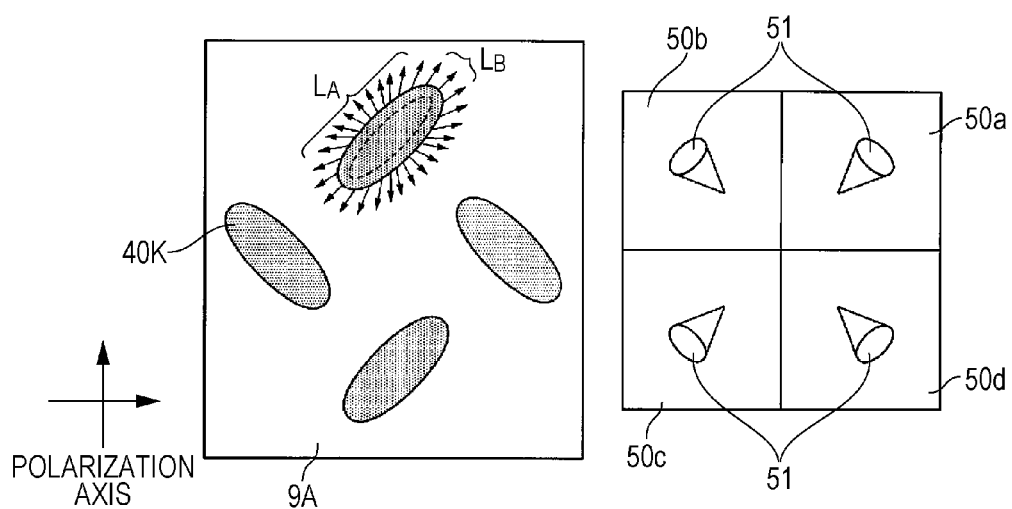
FIG. 20 is a schematic view illustrating an arrangement relationship between a pixel including a VA mode liquid crystal and the light control member.

FIG. 20 is a schematic view illustrating an alignment relationship between a pixel 50 including a VA-mode liquid crystal and the light control member 9A which are included in the liquid crystal display device 1. Actually, as illustrated in FIG. 1, the light control member 9A is disposed on the pixel 50. However, for convenience of explanation, the pixel 50 and the light control member 9A are illustrated in parallel in FIG. 20.

As is the case with the first embodiment, the pixel 50 in this embodiment employs the four-domain VA in which one pixel 50 is divided into a first domain 50a, a second domain 50b, a third domain 50c, and a fourth domain 50d.

In this embodiment, a polarization axis of the first polarizing plate 3 is set to a direction in which the azimuth angle ϕ is 0° or 180°. A polarization axis of the second polarizing plate 7 is set to a direction in which the azimuth angle ϕ is 90° or 270°.

As is the case with the first embodiment, a director of a liquid crystal molecule 51 that is included in the first domain 50a is inclined in such a manner that the polar angle θ at an azimuth angle ϕ of 45° becomes greater than 0°. When aligning the liquid crystal molecule 51 as described above, at the central portion of the liquid crystal layer 11 in a thickness direction during application of a voltage in the first domain 50a, the liquid crystal molecule 51 falls down in such a manner that the azimuth angle ϕ becomes 45° and the polar angle becomes close to 90°.

A director of a liquid crystal molecule 51 that is included in the second domain 50b is inclined in such a manner that the polar angle θ at an azimuth angle ϕ of 135° becomes greater than 0°. When aligning the liquid crystal molecule 51 as described above, at the central portion of the liquid crystal layer 11 in a thickness direction during application of a voltage in the second domain 50b, the liquid crystal molecule 51 falls down in such a manner that the azimuth angle ϕ becomes 135° and the polar angle becomes close to 90°.

A director of a liquid crystal molecule 51 that is included in the third domain 50c is inclined in such a manner that the polar angle θ at an azimuth angle ϕ of 225° becomes greater than 0°. When aligning the liquid crystal molecule 51 as described above, at the central portion of the liquid crystal layer 11 in a thickness direction during application of a voltage in the third domain 50c, the liquid crystal molecule 51 falls down in such a manner that the azimuth angle ϕ becomes 225° and the polar angle becomes close to 90°.

A director of a liquid crystal molecule 51 that is included in the fourth domain 50d is inclined in such a manner that the polar angle θ at an azimuth angle ϕ of 315° becomes greater than 0°. When aligning the liquid crystal molecule 51 as described above, at the central portion of the liquid crystal layer 11 in a thickness direction during application of a voltage in the fourth domain 50d, the liquid crystal molecule 51 falls down in such a manner that the azimuth angle ϕ becomes 315° and the polar angle becomes close to 90°.

As illustrated in FIG. 18, in the light control member 9A of this embodiment, a plurality of light-shielding layers 40K are provided on one surface of the base material 39 in a scattered manner. A planar shape of each of the light-shielding layers 40K when viewed from the normal direction of the base material 39 is an elongated elliptical shape. The light-shielding layer 40K has an anisotropic shape having a major axis and a minor axis. A ratio of a major axis dimension to a minor axis dimension in the elliptical shape is, for example, 1.1 to 2.5.

The major axis dimension of the light-shielding layer 40K is, for example, 20 µm, and the minor axis dimension of the light-shielding layer 40K is, for example, 10 µm. In the light control member 9 of this embodiment, in each of the light-shielding layers 40K, a ratio of the length of the minor axis to the length of the major axis is approximately the same.

In the light control member 9A of this embodiment, a major axis direction of the ellipse that constitutes the planar shape of each of the light-shielding layers 40K (hereinafter, may be referred to as a major axis direction of a light-shielding layer) is aligned approximately in a direction in which the azimuth angle ϕ is 45° or 225° or a direction in which the azimuth angle ϕ is 135° or 315°. A ratio between a light-shielding layer 40K in which the major axis direction is aligned approximately in a direction in which the azimuth angle ϕ is 45° or 225°, and a light-shielding layer 40K in which the major axis direction is aligned approximately in a direction in which the azimuth angle ϕ of 135° or 315° is set to approximately 1:1.

That is, the major axis direction of the light-shielding layer 40K, and the polarization axis of the first polarizing plate 3 and the polarization axis of the second polarizing plate 7 are different from each other by an azimuth angle ϕ of 45°.

In a case where the major axis direction of the light-shielding layer 40K is aligned approximately in a direction in which the azimuth angle ϕ is 45° or 225°, when considering a direction of the reflective surface 41c of the light-diffusing portion 41, in the reflective surface 41c of the light-diffusing portion 41, a ratio of the reflective surface 41c along a direction in which the azimuth angle ϕ is 45° or 225° is greater than a ratio of the reflective surface 41c along a direction in which the azimuth angle φ is 135° or 315°. Accordingly, light LA that is reflected from the reflective surface 41c along a direction in which the azimuth angle φ is 45° or 225° and diffuses in a direction in which the azimuth angle φ is 135° or 315° is greater than light LB that is reflected from the reflective surface 41c along a direction in which the azimuth angle φ is 135° or 315° and diffuses in the direction of 45° or 225°.

In a case where the major axis direction of the light-shielding layer 40K is aligned approximately in a direction in which the azimuth angle φ is 135° or 315°, when considering a direction of the reflective surface 41c of the light-diffusing portion 41, in the reflective surface 41c of the light-diffusing portion 41, a ratio of the reflective surface 41c along a direction in which the azimuth angle φ is 135° or 315° is greater than a ratio of the reflective surface 41c along a direction in which the azimuth angle φ is 45° or 225°. Accordingly, light LA that is reflected from the reflective surface 41c along a direction in which the azimuth angle φ is 135° or 315° and diffuses in a direction in which the azimuth angle φ is 45° or 225° is greater than light LB that is reflected from the reflective surface 41c along a direction in which the azimuth angle φ is 45° or 225° and diffuses in the direction of 135° or 315°.

According to this configuration, an azimuth angle direction in which light-diffusibility of the light control member 9A is relatively strong becomes the azimuth angle φ of 45° or 225°, and the azimuth angle φ of 135° or 315°. In a direction at the azimuth angle φ of 0° or 180° which is the polarization axis of the first polarizing plate 3, and in the polarization axis of the second polarizing plate 7, the light-diffusibility of the light control member 9 becomes relatively low.

When viewed from the normal direction of the light control member 9A, the light-diffusibility of the light control member 9A has line symmetry to an axis in the direction in which the azimuth angle φ is 45° or 225°. Similarly, it can be said that the light-diffusibility of the light control member 9A also has line symmetry to an axis in a direction in which the azimuth angle φ is 0° or 180°, an axis in a direction in which the azimuth angle φ is 90° or 270°, and an axis in a direction in which the azimuth angle φ is 135° or 315°. As described above, in this embodiment, the configuration in which the light-diffusibility has the line symmetry to a plurality of axes is referred to as a configuration in which the light-diffusibility has line symmetry of two axes or more.

Next, comparison will be made between a case (comparative example) of a liquid crystal display device that does not include the light control member, a case of the liquid crystal display device 1 that includes the light control member 9 of the first embodiment, and a case of the liquid crystal display device 1 that includes the light control member 9A of this embodiment.

First, the case of the liquid crystal display device of the comparative example will be described. FIG. 21 illustrates gamma characteristics in the case of changing the polar angle θ at an azimuth angle φ of 0° in the liquid crystal display device according to the comparative example. In FIG. 21, the horizontal axis represents a gray scale, and the vertical axis represents normalized luminance. In FIG. 21, a reference numeral 141 represents gamma characteristics at a polar angle θ of 0°. A reference numeral 142 represents gamma characteristics at a polar angle θ of 15°. A reference numeral 143 represents gamma characteristics at a polar angle θ of 30°. A reference numeral 144 represents gamma characteristics at a polar angle θ of 45°. A reference numeral 145 represents gamma characteristics at a polar angle θ of 60°. A reference numeral 146 represents gamma characteristics at a polar angle θ of 75°.

FIG. 22 illustrates gamma characteristics in the case of changing the polar angle θ at an azimuth angle φ of 315° in the liquid crystal display device according to the comparative example. In FIG. 22, the horizontal axis represents a gray scale, and the vertical axis represents normalized luminance. In FIG. 22, a reference numeral 151 represents gamma characteristics at a polar angle θ of 0°. A reference numeral 152 represents gamma characteristics at a polar angle θ of 15°. A reference numeral 153 represents gamma characteristics at a polar angle θ of 30°. A reference numeral 154 represents gamma characteristics at a polar angle θ of 45°. A reference numeral 155 represents gamma characteristics at a polar angle θ of 60°. A reference numeral 156 represents gamma characteristics at a polar angle θ of 75°.

It can be seen that the gamma characteristics of the liquid crystal display device of the comparative example at the azimuth angle φ of 315°, which are illustrated in FIG. 22, greatly vary depending on the polar angle at a low gray scale below 25 gray scales unlike the gamma characteristics of the liquid crystal display device of the comparative example at the azimuth angle φ of 0° which are illustrated in FIG. 21. Specifically, as the polar angle becomes larger, a normalized luminance value increases. That is, at the azimuth angle φ of 315°, when a visual point of an observer is inclined in such a manner that the polar angle θ becomes larger, it can be seen that white blur occurs in low-gray-scale display. As illustrated in FIG. 22, it can be seen that white blur occurs in the low-gray-scale display in a zero gray scale.

As described above, when the visual point of an observer is gradually inclined from an azimuth angle that is different from the polarization axis of the first polarizing plate 3 and the polarization axis of the second polarizing plate 7 by 45°, it can be seen that the white burr occurs in the low-gray-scale display in the liquid crystal display device of the comparative example.

Next, description will be given of the liquid crystal display device 1 including the light control member 9 of the first embodiment.

Figure 23:
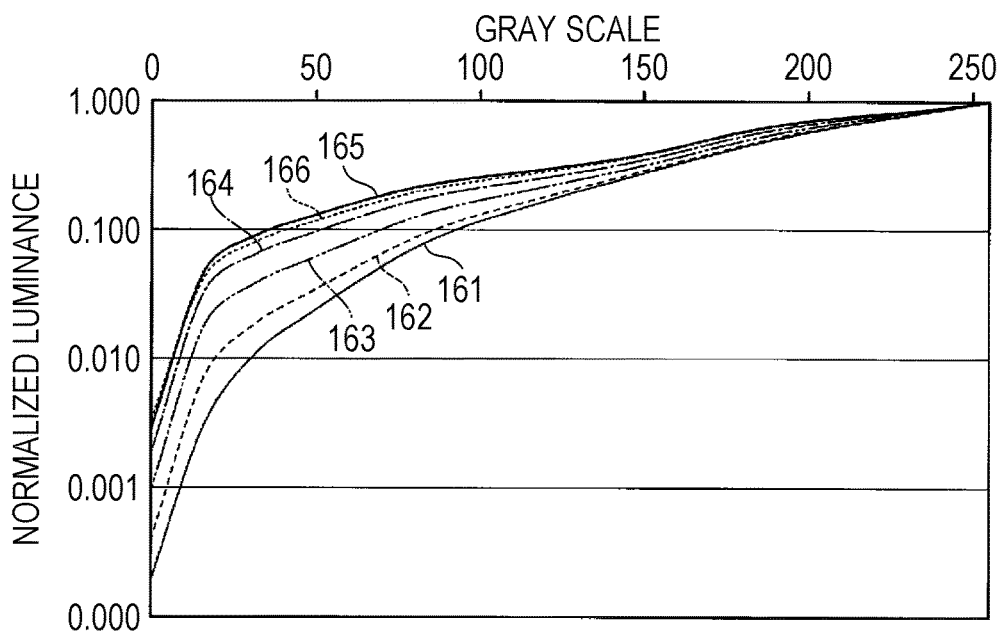
FIG. 23 is a view illustrating gamma characteristics in the case of changing the polar angle $\theta$ at an azimuth angle $\phi$ of 0° in the liquid crystal display device according to the first embodiment of the invention.

FIG. 23 illustrates gamma characteristics in the case of changing the polar angle θ at an azimuth angle φ of 0° in the liquid crystal display device 1 according to the first embodiment of the invention. In FIG. 23, the horizontal axis represents a gray scale, and the vertical axis represents normalized luminance. In FIG. 23, a reference numeral 161 represents gamma characteristics at a polar angle θ of 0°. A reference numeral 162 represents gamma characteristics at a polar angle θ of 15°. A reference numeral 163 represents gamma characteristics at a polar angle θ of 30°. A reference numeral 164 represents gamma characteristics at a polar angle θ of 45°. A reference numeral 165 represents gamma characteristics at a polar angle θ of 60°. A reference numeral 166 represents gamma characteristics at a polar angle θ of 75°. In addition, in the measurement, a light control member, in which an inclination angle of the light-diffusing portion is 80°, and an area ratio of the light-shielding layer 40 is 30%, is used.

As illustrated in FIG. 23, it can be seen that a variation in gamma characteristics depending on the polar angle θ in the liquid crystal display device 1 of the first embodiment decreases as compared to the case of the liquid crystal display device of the comparative example illustrated in FIG. 21. Specifically, gamma characteristics at a polar angle θ of 30° or greater become close to gamma characteristics at a polar angle θ of 0°.

Figure 24:
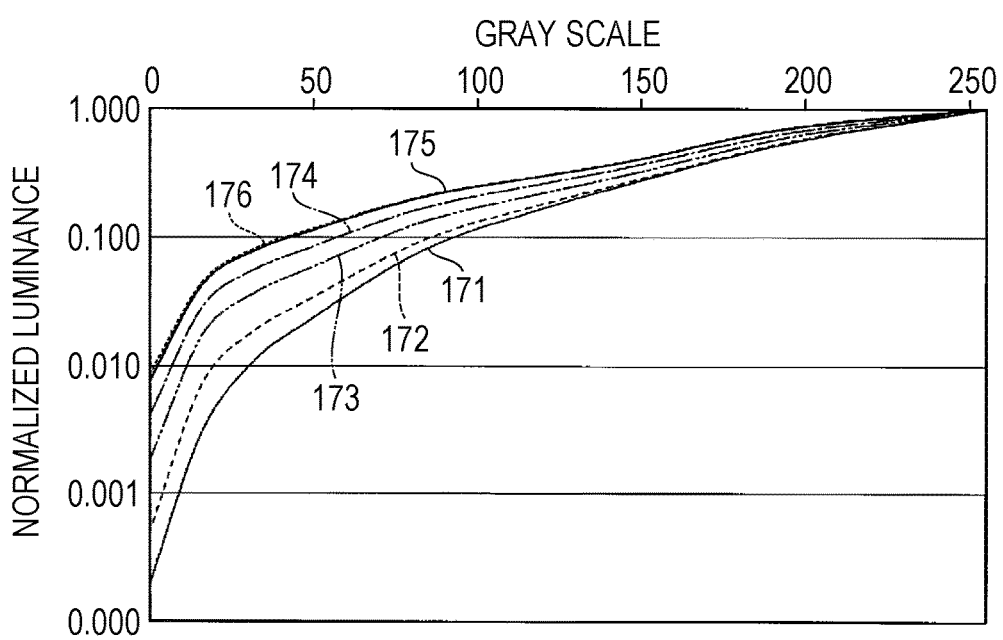
FIG. 24 is a view illustrating gamma characteristics in the case of changing the polar angle $\theta$ at an azimuth angle $\phi$ of 315° in the liquid crystal display device according to the first embodiment of the invention.

FIG. 24 illustrates gamma characteristics in the case of changing the polar angle θ at an azimuth angle φ of 315° in the liquid crystal display device 1 according to the first embodiment of the invention. In FIG. 24, the horizontal axis represents a gray scale, and the vertical axis represents normalized luminance. In FIG. 24, a reference numeral 171 represents gamma characteristics at a polar angle θ of 0°. A reference numeral 172 represents gamma characteristics at a polar angle θ of 15°. A reference numeral 173 represents gamma characteristics at a polar angle θ of 30°. A reference numeral 174 represents gamma characteristics at a polar angle θ of 45°.

A reference numeral 175 represents gamma characteristics at a polar angle θ of 60°. A reference numeral 176 represents gamma characteristics at a polar angle θ of 75°. In addition, in the measurement, a light control member, in which an inclination angle of the light-diffusing portion is 80°, and an area ratio of the light-shielding layer 40 is 30%, is used.

As illustrated in FIG. 24, it can be seen that a variation in gamma characteristics depending on the polar angle θ in the liquid crystal display device 1 of the first embodiment decreases as compared to the case of the liquid crystal display device of the comparative example illustrated in FIG. 22. Specifically, gamma characteristics at a polar angle θ of 30° or greater become close to gamma characteristics at a polar angle θ of 0°. Particularly, it can be seen that at a polar angle θ of 45° or greater, gamma characteristics of a low gray scale below 25 gray scales are improved and become close to the gamma characteristics at the polar angle θ of 0°. From these results, it can be said that the white blur in low-gray-scale display, which occurs when inclining the visual point of the observer in such a manner that the polar angle θ becomes larger, is improved.

Next, description will be given of the case of the liquid crystal display device 1 that includes the light control member 9A of this embodiment.

Figure 25:
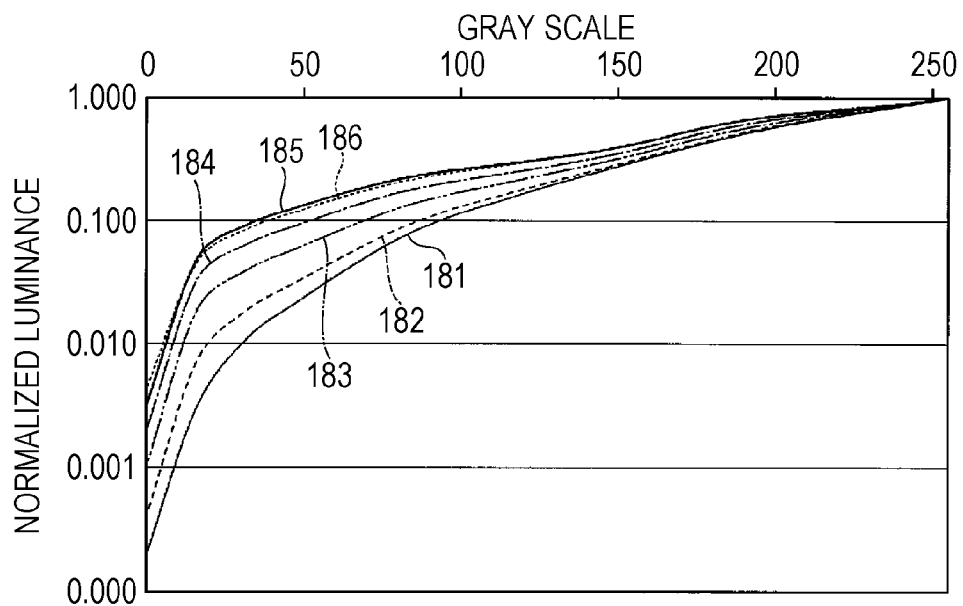
FIG. 25 is a view illustrating gamma characteristics in the case of changing the polar angle $\theta$ at an azimuth angle $\phi$ of 0° in a liquid crystal display device according to a seventh embodiment of the invention.

FIG. 25 illustrates gamma characteristics in the case of changing the polar angle θ at an azimuth angle φ of 0° in the liquid crystal display device 1 according to this embodiment. In FIG. 25, the horizontal axis represents a gray scale, and the vertical axis represents normalized luminance. In FIG. 25, a reference number 181 represents gamma characteristics at a polar angle θ of 0°. A reference number 182 represents gamma characteristics at a polar angle θ of 15°. A reference number 183 represents gamma characteristics at a polar angle θ of 30°. A reference number 184 represents gamma characteristics at a polar angle θ of 45°. A reference number 185 represents gamma characteristics at a polar angle θ of 60°. A reference number 186 represents gamma characteristics at a polar angle θ of 75°. In addition, in the measurement, a light control member, in which an inclination angle of the light-diffusing portion is 80°, and an area ratio of the light-shielding layer 40 is 30%, is used. In addition, a major axis dimension of the light-shielding layer is 20 μm, and a minor axis dimension thereof is 10 μm.

As illustrated in FIG. 25, it can be seen that a variation in gamma characteristics depending on the polar angle θ in the liquid crystal display device 1 of this embodiment decreases as compared to the case of the liquid crystal display device of the comparative example illustrated in FIG. 21. Specifically, gamma characteristics at a polar angle θ of 30° or greater become close to gamma characteristics at a polar angle θ of 0°.

On the other hand, gamma characteristics of the liquid crystal display device 1 of this embodiment as illustrated in FIG. 25 do not greatly vary in comparison to gamma characteristics of the liquid crystal display device 1 of the first embodiment which are illustrated in FIG. 23.

Figure 26:
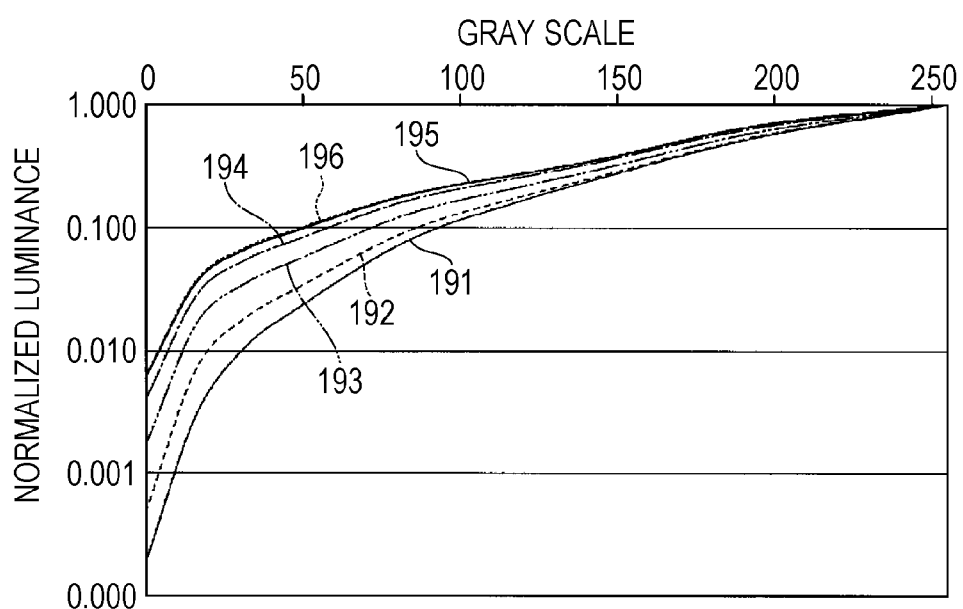
FIG. 26 is a view illustrating gamma characteristics in the case of changing the polar angle $\theta$ at an azimuth angle $\phi$ of 315° in the liquid crystal display device according to the seventh embodiment of the invention.

FIG. 26 illustrates gamma characteristics in the case of changing the polar angle θ at an azimuth angle φ of 315° in the liquid crystal display device 1 of this embodiment. In FIG. 26, the horizontal axis represents a gray scale, and the vertical axis represents normalized luminance. In FIG. 26, a reference numeral 191 represents gamma characteristics at a polar angle θ of 0°. A reference numeral 192 represents gamma characteristics at a polar angle θ of 15°. A reference numeral 193 represents gamma characteristics at a polar angle θ of 30°. A reference numeral 194 represents gamma characteristics at a polar angle θ of 45°. A reference numeral 195 represents gamma characteristics at a polar angle θ of 60°. A reference numeral 196 represents gamma characteristics at a polar angle θ of 75°. In addition, in the measurement, a light control member, in which an inclination angle of the light-diffusing portion is 80°, and an area ratio of the light-shielding layer 40 is 30%, is used. In addition, a major axis dimension of the light-shielding layer is 20 μm, and a minor axis dimension thereof is 10 μm.

As illustrated in FIG. 26, it can be seen that a variation in gamma characteristics depending on the polar angle θ in the liquid crystal display device 1 of this embodiment decreases as compared to the case of the liquid crystal display device of the comparative example illustrated in FIG. 22. Specifically, gamma characteristics at a polar angle θ of 30° or greater become close to gamma characteristics at a polar angle θ of 0°.

In addition, it can be seen that a variation in gamma characteristics depending on the polar angle θ in the liquid crystal display device 1 of this embodiment as illustrated in FIG. 26 decreases further than in the liquid crystal display device of the first embodiment as illustrated in FIG. 24.

Particularly, the gamma characteristics at the polar angle θ of 60° or greater are further improved. From these results, it can be said that the white blur in low-gray-scale display, which occurs when inclining the visual point of the observer in such a manner that the polar angle θ becomes larger, is improved.

The reason for the improvement in the viewing angle characteristics at the azimuth angle φ of 315° in the liquid crystal display device 1 of this embodiment in comparison to the liquid crystal display device 1 of the first embodiment is as follows.

As described above, in the light control member 9A of this embodiment, with regard to an azimuth angle direction, the light-diffusibility in a direction in which the azimuth angle φ is 45° or 225° and in a direction in which the azimuth angle φ is 135° or 315° is relatively strong. That is, a large amount of light is mixed-in in the direction in which the azimuth angle φ is 45° or 225° and in the direction in which the azimuth angle φ is 135° or 315°.

As can be seen from the result of the comparative example in FIG. 22, the direction in which the azimuth angle φ is 45° or 225° and the direction in which the azimuth angle φ is 135° or 315° correspond to azimuth angles φ in which the viewing angle characteristics during low-gray-scale display in the liquid crystal display device are low. In this embodiment, an azimuth angle φ at which the viewing angle characteristics during low-gray-scale display of the liquid crystal display device are low, and an azimuth angle φ at which the light-diffusibility of the light control member 9A is relatively strong are made to match each other. According to this, rays of light, which are emitted in directions at polar angles θ different from each other and at the azimuth angle φ at which the viewing angle characteristics during lowgray-scale display are low, are mixed-in and are averaged. As a result, the viewing angle characteristics depending on the polar angle θ are improved.

In addition, FIG. 22, FIG. 24, and FIG. 26 illustrate gamma characteristics at azimuth angle φ of 315°, but the results are also true of gamma characteristics at azimuth angles φ of 45°, 135°, and 225°. This results from a fact that the major axis of the light-shielding portion 40K of this embodiment extends along a direction in which the azimuth angle φ is 45° or 225° or a direction in which the azimuth angle φ is 135° or 315°, and a ratio between a light-shielding layer 40K of which the major axis extends along a direction in which the azimuth angle φ is 45° or 225°, and a light-shielding layer 40K of which the major axis extends along a direction in which the azimuth angle φ is 135° or 315° is approximately 1:1.

In this embodiment, an azimuth angle direction in which diffusibility of the light control member 9A is relatively strong corresponds to a direction in which the azimuth angle φ is 45° or 225° and a direction in which the azimuth angle φ is 135° or 315°. Accordingly, rays of light, which are incident to the light control member 9 at polar angles θ differing from each other, are mixed-in at the direction in which the azimuth angle φ is 45° or 225° and the direction in which the azimuth angle φ is 135° or 315° by the light control member 9. As a result, variations in luminance change in the direction in which the azimuth angle φ is 45° or 225° and the direction in which the azimuth angle φ is 135° or 315° are averaged, and thus variations in gamma characteristics depending on the polar angle θ in the direction in which the azimuth angle φ is 45° or 225° and the direction in which the azimuth angle φ is 135° or 315° are mitigated.

The eyes of human beings are sensitive to luminance change in the low-gray-scale display, and thus it can be said that the improvement of the viewing angle characteristics during low-gray-scale display in this embodiment is effective for an improvement of a display performance in a liquid crystal display device.

In this embodiment, as illustrated in FIG. 2, the light control member 9A is disposed on a light-emitting side of the liquid crystal panel 2. As a result, rays of light, which are incident to the light control member 9A at polar angles θ differing from each other, are mixed-in by the light control member 9A. As a result, variations in luminance change depending on the polar angle θ are averaged, and as a result, variations in gamma characteristics depending on the polar angle θ are mitigated.

Eighth Embodiment

Hereinafter, an eighth embodiment of the invention will be described with reference to FIG. 27A to FIG. 27F.

The basic configuration of a liquid crystal display device of this embodiment is the same as in the seventh embodiment except that the shape of the light-shielding layer in the light control member 9A is a shape that is inscribed in an ellipse.

Accordingly, in this embodiment, description of the basic configuration of the liquid crystal display device will be omitted, and the light-shielding layer will be described.

FIG. 27A to FIG. 27F are plan views of the light-shielding layer of this embodiment.

As illustrated in FIG. 27A to FIG. 27F, the shape of the light-shielding layer of this embodiment is a shape that is inscribed in an ellipse.

Figure 27A:
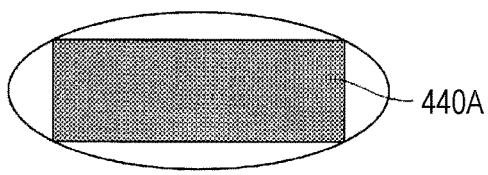
FIG. 27A is a plan view of a light-shielding layer according to an eighth embodiment of the invention.
Figure 27B:
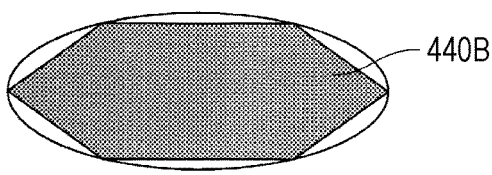
FIG. 27B is a plan view of the light-shielding layer according to the eighth embodiment of the invention.
Figure 27C:
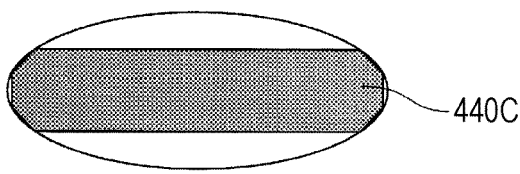
FIG. 27C is a plan view of the light-shielding layer according to the eighth embodiment of the invention.
Figure 27D:
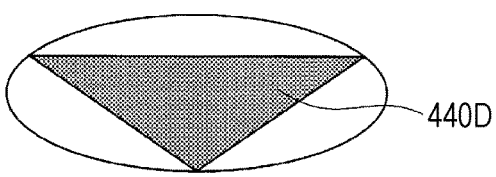
FIG. 27D is a plan view of the light-shielding layer according to the eighth embodiment of the invention.
Figure 27E:
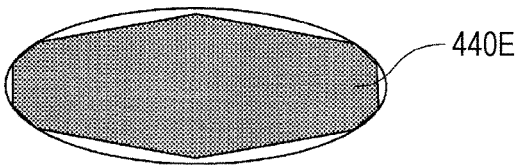
FIG. 27E is a plan view of the light-shielding layer according to the eighth embodiment of the invention.
Figure 27F:
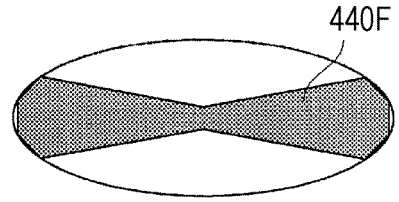
FIG. 27F is a plan view of the light-shielding layer according to the eighth embodiment of the invention.
Figure 28A:
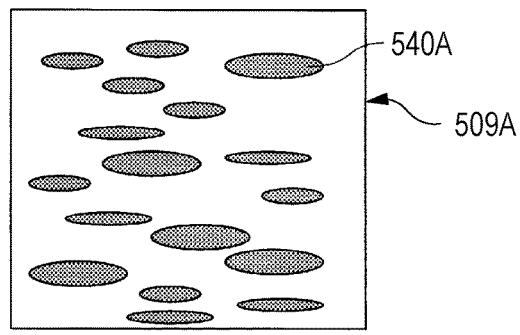
FIG. 28A is a plan view of a light control member according to a ninth embodiment of the invention.
Figure 28B:
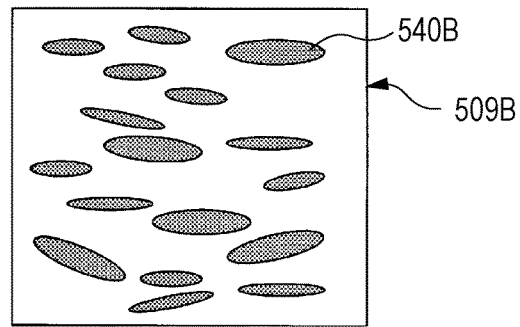
FIG. 28B is a plan view of the light control member according to the ninth embodiment of the invention.
Figure 28C:
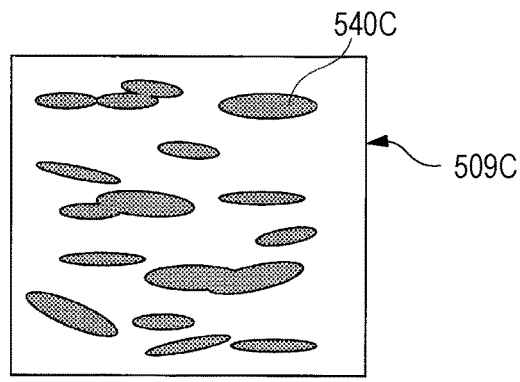
FIG. 28C is a plan view of the light control member according to the ninth embodiment of the invention.
Figure 28D:
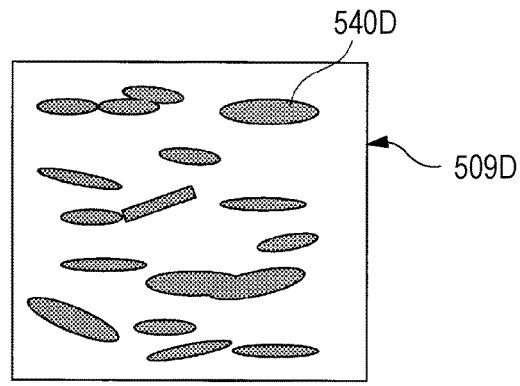
FIG. 28D is a plan view of the light control member according to the ninth embodiment of the invention.

Specifically, a shape of a light-shielding layer 440A illustrated in FIG. 27A is a rectangular shape that is inscribed in an ellipse. A shape of a light-shielding layer 440B illustrated in FIG. 27B is a hexagonal shape that is inscribed in an ellipse. A shape of a light-shielding layer 440C illustrated in FIG. 27C is an octagonal shape that is inscribed in an ellipse. A shape of a light-shielding layer 440D illustrated in FIG. 27D is a triangular shape that is inscribed in an ellipse. A shape of a light-shielding layer 440E illustrated in FIG. 27E is a decagonal shape that is inscribed in an ellipse. A shape of a light-shielding layer 440F illustrated in FIG. 27F is a shape that is inscribed in an ellipse. The central portion of the light-shielding layer 440F is narrower than a portion that is inscribed in the ellipse.

In this embodiment, the major axis direction of the light-shielding layers 440A to 440F, the polarization axis of the first polarizing plate 3 and the polarization axis of the second polarizing plate 7 are different from each other by an azimuth angle φ of 45°.

Even when using the light-shielding layers 440A to 440F of this embodiment, rays of light, which are incident to the light control member 9A at polar angles θ different from each other, are mixed-in by the light control member 9A. As a result, variations in luminance change depending on the polar angle θ are averaged, and as a result, variations in gamma characteristics depending on the polar angle θ are mitigated. As a result, the white blur in low-gray-scale display, which occurs when inclining the visual point of the observer in such a manner that the polar angle θ becomes larger, is improved.

Ninth Embodiment

Hereinafter, a ninth embodiment of the invention will be described with reference to FIG. 28A to FIG. 28D.

The basic configuration of a liquid crystal display device of this embodiment is the same as in the seventh embodiment except for a configuration of a light-shielding layer in the light control member.

Accordingly, in this embodiment, description of the basic configuration of the liquid crystal display device will be omitted, and the light control member will be described.

FIG. 28A to FIG. 28D are plan views of the light control member of this embodiment.

As illustrated in FIG. 28A to FIG. 28D, the light control member of this embodiment is different from the light control member of the first embodiment in the configuration of the light-shielding layer.

Specifically, in the light control member 9A of the seventh embodiment, a ratio of the length of the minor axis to the length of the major axis is approximately the same in each of the light-shielding layers 40K. In contrast, in a light control member 509A illustrated in FIG. 28A, light-shielding layers 540A, in which ratios of the length of the minor axis to the length of the major axis are different from each other, are mixed-in.

In addition, in the light control member 9A of the seventh embodiment, the major axis direction of each of the light-shielding layers 40 is arranged in a direction in which the azimuth angle φ is 90° or 270°. In contrast, in a light control member 509B illustrated in FIG. 28B, the major axis of parts of a plurality of light-shielding layers 540B extends in a direction which is different from a direction of the major axis of other light-shielding layers 540B.

In addition, in the light control member 9A of the seventh embodiment, all of the plurality of light-shielding layers 40K are arranged in a scattered manner. In contrast, in a light control member 509C illustrated in FIG. 28C, parts of a plurality of light-shielding layers 540C are connected to each other.

In addition, in the light control member 9A of the seventh embodiment, the shape of all of the plurality of light-shielding layers 40 is an elliptical shape. In contrast, in a light control member 509D illustrated in FIG. 28D, parts of a plurality of light-shielding layers 540D have a rectangular shape.

Even when using the light control members 509A to 509D of this embodiment, rays of light, which are incident to the light control member 9A at polar angles θ different from each other, are mixed-in by the light control member 9A. As a result, variations in luminance change depending on the polar angle θ are averaged, and as a result, variations in gamma characteristics depending on the polar angle θ are mitigated. As a result, the white blur in low-gray-scale display, which occurs when inclining the visual point of the observer in such a manner that the polar angle θ becomes larger, is improved.

Tenth Embodiment

Figure 29:
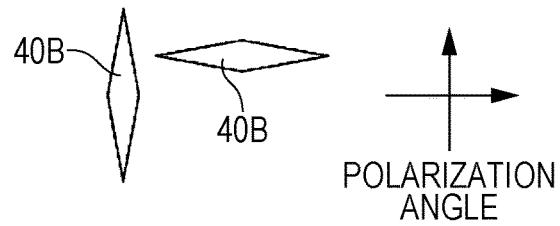
FIG. 29 is a plan view of a light control member according to a tenth embodiment of the invention.

Hereinafter, a tenth embodiment of the invention will be described with reference to FIG. 29 to FIG. 31.

The basic configuration of a liquid crystal display device of this embodiment is the same as in the first embodiment except for a configuration of the light control member.

Accordingly, in this embodiment, description of the basic configuration of the liquid crystal display device will be omitted, and the light control member will be described.

In the light control member of this embodiment, the planar shape of each of light-shielding layers 40B is a rhombic shape. Two diagonal lines of the rhombic shape approximately match the polarization axes of the first polarizing plate 3 and the second polarizing plate 7, respectively. When assuming that, the longer side in the two diagonal lines of the rhombic shape is set as the major axis, a ratio of the light-shielding layers 40B in which the major axis approximately matches the polarization axis of the first polarizing plate 3, and a ratio of the light-shielding layers 40B in which the major axis approximately matches the polarization axis of the second polarizing plate 7 may be approximately 1:1.

The planar shape of each of the light-shielding layers 40B of this embodiment is a rhombic shape in which an acute angle is 30°. In addition, a reflective surface 41c of the light-diffusing portion 41 has an inclination angle of 85°. An operation of a light control member including the light-shielding layer 40B will be described below.

Figure 30A:
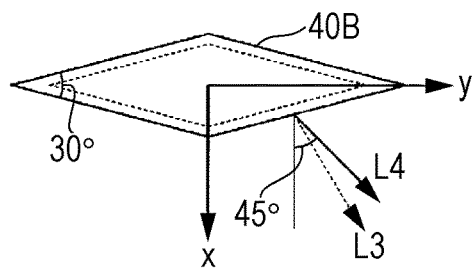
FIG. 30A is a view illustrating operation of the light control member according to the tenth embodiment of the invention.
Figure 31:
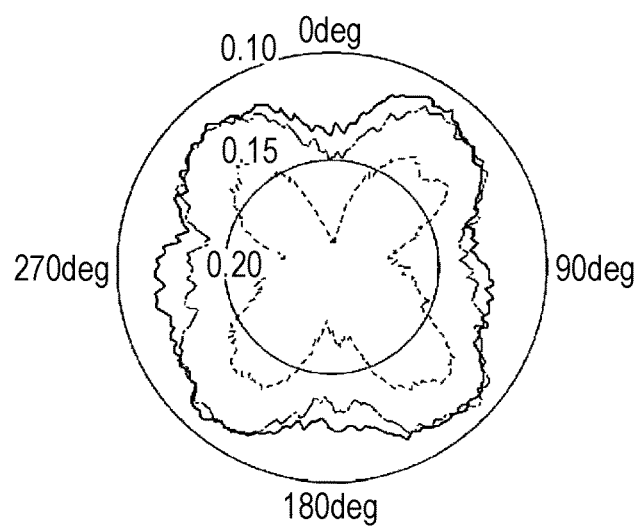
FIG. 31 is a graph obtained by plotting a Δu'v' value at respective azimuth angles at a polar angle of 60°.

FIG. 30A is a plan view of the light control member. Here, the polarization axes of the first polarizing plate 3 and the second polarizing plate 7 match a y-axis and an x-axis, respectively. Light L4, which is emitted after passing through the second polarizing plate 7, is reflected from a light reflective surface 41c. At this time, a reflection angle of the light L4 is approximately 45° when viewed from the normal direction of an xy plane.

Figure 30B:
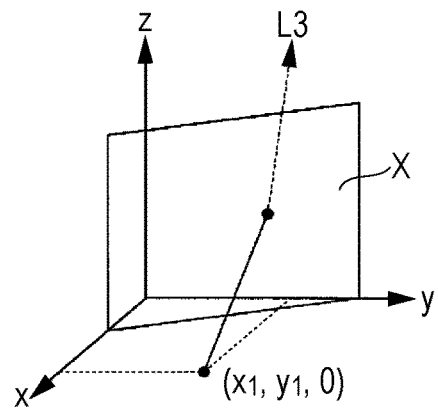
FIG. 30B is a view illustrating the operation of the light control member according to the tenth embodiment of the invention.
Figure 30C:
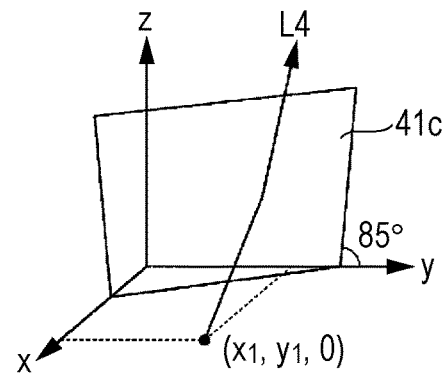
FIG. 30C is a view illustrating the operation of the light control member according to the tenth embodiment of the invention.

The reason for this will be described with reference to FIG. 30B and FIG. 30C. FIG. 30B is a view illustrating reflection of light L3 in a case of a reflective surface X that does not have an inclination angle. FIG. 30C is a view illustrating reflection of light L4 in a case of a reflective surface 41c that has an inclination angle of 85°.

First, as illustrated in FIG. 30B, in a case where the reflective surface X does not have an inclination angle and is parallel with the z-axis, when light L3 parallel with an xz plane passing through a coordinate $(x_1, y_1, 0)$ is incident, the light L3 is reflected from the reflective surface X. When an optical path of the light L3 is viewed from a top surface side, the optical path is as illustrated in FIG. 30A.

On the other hand, the light reflective surface 41c of this embodiment has an inclination angle of 85° as illustrated in FIG. 30C. Accordingly, even when light L4 passes through the coordinate $(x_1, y_1, 0)$ and is incident to the reflective surface 41c similar to the light L3, the resultant reflected light L3 does not have an optical path that is the same as the optical path of the light L3, and a reflection angle increases as illustrated in FIG. 30A. Specifically, as illustrated in FIG. 30A, the light L4 is reflected in a direction at 45° with respect to the x-axis.

Next, description will be given of an effect of using a light control member from which light is reflected in a direction at 45° with respect to the polarization axis of the second polarizing plate 7. FIG. 31 is a graph obtained by plotting a Δu'v' value at respective azimuth angles at the polar angle of 60°. Δu'v' represents an inter-coordinate distance in a u'v' uniform color space between a u'v' chromaticity of a color that is seen at an arbitrary polar angle and an arbitrary azimuth angle when displaying an arbitrary color on a front side, and a u'v' chromaticity in a front direction. As a value of Δu'v' becomes larger, a difference in a color tone viewed from the front direction, and a color tone viewed at a certain polar angle and a certain azimuth angle becomes larger. FIG. 31 illustrates Δu'v' characteristics when displaying color No. 13 "Blue" of a Macbeth chart. The center of a circle in FIG. 31 is Δu'v' of 0.20. As is distant from the center of the circle, Δu'v' becomes smaller, and a circle on an inner side has Δu'v' of 0.15, and a circle on an outer side has Δu'v' of 0.10. In FIG. 31, a solid line represents Δu'v' characteristics of the liquid crystal display device using the light control member in this embodiment. In FIG. 31, a one-dot chain line represents Δu'v' characteristics in the liquid crystal display device of the first embodiment. A broken line represents Δu'v' characteristics in the liquid crystal display device (comparative example) that does not use the light control member. In addition, a ratio of the light-diffusing portion 41 in the light control member of this embodiment and the first embodiment is set to 70%.

As indicated by the broken line, in the comparative example, Δu'v' is small at azimuth angles of approximately 45°, 135°, 225°, and 315°. In addition, Δu'v' is large at azimuth angles of approximately 0°, 90°, 180°, and 270° which deviate from the azimuth angle, at which Δu'v' is small, by 45°. That is, the Δu'v' characteristics have azimuth angle dependency, and at azimuth angles of approximately 0°, 90°, 180°, and 270°, a difference in color tone is large between a case of viewing the front side and a case of viewing from an oblique angle.

In the liquid crystal display device of the first embodiment in which the light-shielding portion 40 has a circular shape, as indicated by the one-dot chain line, it can be seen that the Δu'v' characteristics are improved at all azimuth angles, and the azimuth angle dependency is also improved.

In the liquid crystal display device of this embodiment indicated by the solid line, it can be seen that as is the case with the liquid crystal display device of the first embodiment, the Δu'v' characteristics are improved at all azimuth angles, and the azimuth angle dependency is also improved. In addition, it can be seen that in the liquid crystal display device of this embodiment, the Δu'v' characteristics are further improved at the azimuth angles of approximately 0°, 90°, 180°, and 270°, at which Δu'v' is large, in comparison to the liquid crystal display device of the first embodiment.

In the light control member of this embodiment, light, which is incident to the reflective surface 41c of the light-diffusing portion 41, is reflected in a direction in which the azimuth angle is different by 45°. That is, light at the azimuth angles of 45°, 135°, 225°, and 315°, at which Δu'v' is small, is transmitted through the light control member of this embodiment, and is emitted in a direction that is different by 45°, that is, at an azimuth angle at which Δu'v' is large. As described above, light in which a variation in a color tone is small is distributed in an azimuth angle direction in which a variation in a color tone is large, and thus overall variations of Δu'v' are mitigated.

As described above, when using the light control member of this embodiment, it is possible to realize a liquid crystal display device in which viewing-angle dependency of a color tone is small.

Eleventh Embodiment

The liquid crystal display devices of the first embodiment to the tenth embodiment are applicable to various electronic apparatuses.

Hereinafter, description will be given of electronic apparatuses including the liquid crystal display devices of the first embodiment to the tenth embodiment with reference to FIG. 32 to FIG. 34.

Figure 32:
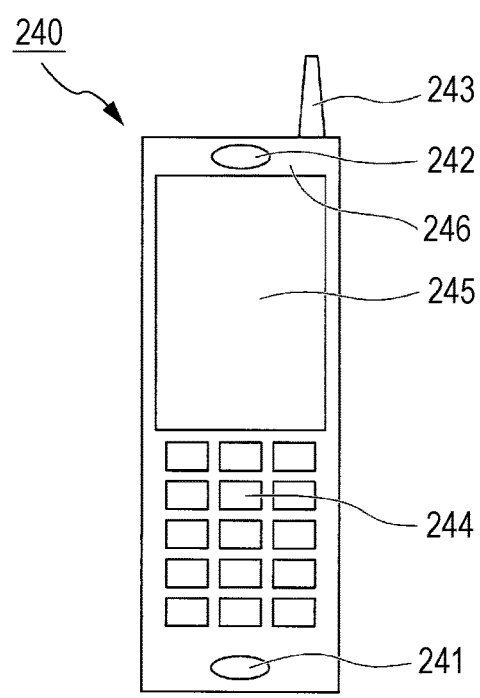
FIG. 32 is an external view illustrating a mobile telephone as an application example of the liquid crystal display devices according to the first to tenth embodiments.

For example, the liquid crystal display devices of the first embodiment to the tenth embodiment are applicable to mobile phones as illustrated in FIG. 32.

A mobile phone 240 illustrated in FIG. 32 includes a voice input unit 241, a voice output unit 242, an antenna 243, an operation switch 244, a display unit 245, a casing 246, and the like.

The liquid crystal display devices of the first embodiment to the tenth embodiment are appropriately applicable as the display unit 245. When the liquid crystal display devices of the first embodiment to the tenth embodiment are applied to the display unit 245 of the mobile phone 240, it is possible to display an image with less viewing-angle dependency.

Figure 33:
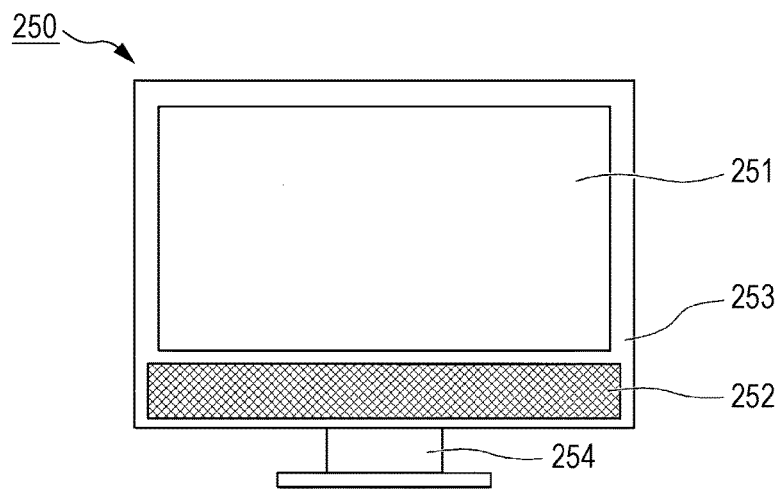
FIG. 33 is an external view illustrating a flat-screen television as an application example of the liquid crystal display devices according to the first to tenth embodiments.

In addition, the liquid crystal display devices of the first embodiment to the tenth embodiment are applicable to, for example, a flat-screen television as illustrated in FIG. 33.

A flat-screen television 250 as illustrated in FIG. 33 includes a display unit 251, a speaker 252, a cabinet 253, a stand 254, and the like.

The liquid crystal display devices of the first embodiment to the tenth embodiment are appropriately applicable as the display unit 251. When the liquid crystal display devices of the first embodiment to the tenth embodiment are applied to the display unit 251 of the flat-screen television 250, it is possible to display an image with less viewing-angle dependency.

Figure 34:
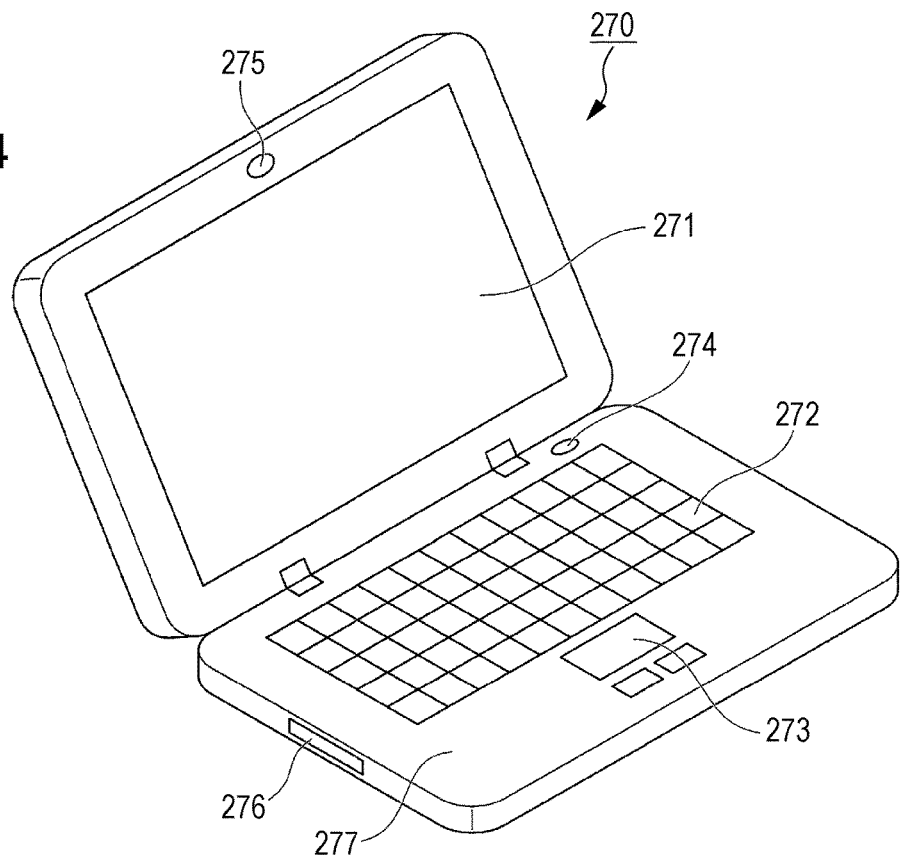
FIG. 34 is an external view illustrating a notebook PC as an application example of the liquid crystal display devices according to the first to tenth embodiments.

The liquid crystal display devices of the first embodiment to the tenth embodiment are applicable to, for example, a notebook computer as illustrated in FIG. 34.

A notebook computer 270 illustrated in FIG. 34 includes a display unit 271, a keyboard 272, a touch pad 273, a main switch 274, a camera 275, a recording medium slot 276, a casing 277, and the like.

The above-described liquid crystal display devices of the first embodiment to the tenth embodiment are applicable to the display unit 271. When the above-described liquid crystal display devices of the first embodiment to the tenth embodiment are applied to the display unit 271 of the notebook computer 270, it is possible to display an image with less viewing angle dependency.

In addition, at least one of an anti-reflective layer, a polarizing filter layer, an antistatic layer, an anti-glare treatment layer, and an anti-fouling treatment layer may be provided on the viewing side of the base material of the light control member in the above-described embodiments. According to this configuration, in accordance with the kind of layers which are provided on the viewing side of the base material, a function of reducing reflection of external light, a function of preventing attachment of dust or contaminants, a function of preventing a damage, and the like can be applied, and thus it is possible to prevent deterioration of viewing angle characteristics with the passage of time.

In addition, in the embodiments, the description has been given to a case where the shape of the light-diffusing portion or spatial portion is set to be a truncated elliptical cone shape, but other shapes are also possible. In addition, the inclination angle of the reflective surface of the light-diffusing portion may not necessarily be symmetrical about an optical axis. In a case where the shape of the light-diffusing portions is set to be the truncated elliptical cone shape similar to those in the above-described embodiments, inclination angles of the reflective surfaces of the light-diffusing portion are line-symmetric about the optical axis, and thus a line-symmetric angle distribution about the optical axis is obtained. In contrast, in a case where an asymmetric angle distribution is intentionally desired in accordance with a usage or a using method of the display device, for example, in a case of desiring to widen a viewing angle only on an upper side or a right side of a screen, the inclination angles of the reflective surface of the light-diffusing portion may be made to be asymmetric.

In addition, specific configurations relating to materials, the number, disposition, and the like of respective constituent members of the liquid crystal display device are not limited to the above-described embodiments, and may be appropriately modified. For example, in the above-described embodiments, the description has been given of an example in which the polarizing plate or the phase plate is disposed on an outer side of the liquid crystal panel. However, instead of the configuration, the polarizing layer or the retarder may be formed on an inner side of a pair of substrates which constitute the liquid crystal panel.

INDUSTRIAL APPLICABILITY

Some aspects of the invention may be applicable to a liquid crystal display device.

REFERENCE SIGNS LIST 1, 200: Light source device
2: Liquid crystal panel
8: Backlight
9: Light control member
39: Base material
40: Light-shielding layer
41: Light-diffusing portion

The invention claimed is:
1. A liquid crystal display device, comprising:
a liquid crystal panel including a first substrate including a first vertical alignment film, a second substrate including a second vertical alignment film, a liquid crystal layer that is between the first vertical alignment film and the second vertical alignment film and has a negative dielectric anisotropy, a first polarizing plate that is on a light-incident side of the liquid crystal layer, and a second polarizing plate that is on a light-emitting side of the liquid crystal layer;

an illuminating device on a light-incident side of the liquid crystal panel, and emitting light toward the liquid crystal panel; and a light control member on a light-emitting side of the liquid crystal panel, and diffusing light that is emitted from the liquid crystal panel in an azimuth angle direction and a polar angle direction viewed from a normal direction of the liquid crystal panel to control an emission direction of the light, wherein the light control member includes a base material and a plurality of light-shielding portions, the liquid crystal panel includes a plurality of pixels, each being a basic unit of display, each of the pixels includes a plurality of regions in which a director direction or an alignment of liquid crystal molecules at a central portion of the liquid crystal layer in a thickness direction during application of a voltage is different, light scattering characteristics of the light control member have line symmetry of two axes or more when viewed from a normal direction of the liquid crystal panel, a planar shape of each of the plurality of light-shielding portions when viewed from a normal direction of the base material is an anisotropic shape having the major axis and the minor axis, an extending direction of the major axis and an extending direction of the minor axis are different among the plurality of light-shielding portions, and the extending direction of the major axis and the extending direction of the minor axis of the plurality of light-shielding portions approximately match a director direction of the liquid crystal molecules in the plurality of regions.

2. The liquid crystal display device according to claim 1, wherein the light control member includes a light-transmissive base material, a light-diffusing portion that is formed on a first surface of the base material, and the plurality of light-shielding portions that is formed in a region on the first surface of the base material other than a region in which the light-diffusing portion is formed, the light-diffusing portion has a light-emitting end surface that is located on a base material side, a light-incident end surface which is located on a side opposite to the base material side, and has an area larger than an area of the light-emitting end surface, and an inclined surface that is located between the light-emitting end surface and the light-incident end surface, a height of the light-diffusing portion from the light-incident end surface to the light-emitting end surface is higher than a height of the plurality of light-shielding portions, and a material having a refractive index, which is lower than a refractive index of the light-diffusing portion, exists in a gap between light-diffusing portions which is in a region in which the light-diffusing portions are not formed.

3. The liquid crystal display device according to claim 2, wherein an angle made by the light-incident end surface and the inclined surface of the light-diffusing portion is 80°±5°.

4. The liquid crystal display device according to claim 2, wherein an area ratio of the plurality of light-shielding portions to a total area of the first surface of the base material is 30%±10%.

5. The liquid crystal display device according to claim 1, wherein the planar shape of each of the light-shielding portions when viewed from a normal direction of the base material is a circular shape.

6. The liquid crystal display device according to claim 1, wherein the planar shape is an elliptical shape.

7. The liquid crystal display device according to claim 1, wherein the planar shape is a polygonal shape that is inscribed in an ellipse.

8. The liquid crystal display device according to claim 1, wherein the first vertical alignment film and the second vertical alignment film are optical alignment films.

9. The liquid crystal display device according to claim 1, wherein the liquid crystal panel performs monaural color display.

* * * * *